US011556980B2

(12) United States Patent
Yankovich et al.

(10) Patent No.: US 11,556,980 B2
(45) Date of Patent: Jan. 17, 2023

(54) METHOD, SYSTEM, AND COMPUTER-READABLE STORAGE MEDIA FOR RENDERING OF OBJECT DATA BASED ON RECOGNITION AND/OR LOCATION MATCHING

(71) Applicant: eBay Inc., San Jose, CA (US)

(72) Inventors: Steve Yankovich, San Jose, CA (US); Andrew Chalkley, San Jose, CA (US); Josh Timonen, San Jose, CA (US); David Beach, San Jose, CA (US)

(73) Assignee: eBay Inc., San Jose, CA (US)

( * ) Notice: Subject to any disclaimer, the term of this patent is extended or adjusted under 35 U.S.C. 154(b) by 61 days.

(21) Appl. No.: 16/189,817

(22) Filed: Nov. 13, 2018

(65) Prior Publication Data

US 2019/0156403 A1    May 23, 2019

Related U.S. Application Data

(60) Provisional application No. 62/588,189, filed on Nov. 17, 2017.

(51) Int. Cl.
*G06Q 30/06* (2012.01)
*G06Q 30/02* (2012.01)
(Continued)

(52) U.S. Cl.
CPC ......... *G06Q 30/0643* (2013.01); *G06Q 30/00* (2013.01); *G06Q 30/02* (2013.01);
(Continued)

(58) Field of Classification Search
CPC ............ G06Q 30/0601–0645; G06Q 30/0643; G06Q 30/00; G06Q 30/02; G06Q 30/0241;
(Continued)

(56) References Cited

U.S. PATENT DOCUMENTS

| 5,347,306 A | 9/1994 | Nitta |
| 6,202,051 B1 | 3/2001 | Woolston |

(Continued)

FOREIGN PATENT DOCUMENTS

| EP | 2259225 A1 | 12/2010 |
| KR | 10-2014-0088578 A | 7/2014 |

(Continued)

OTHER PUBLICATIONS

Google unveils Project Glass augmented reality eyewear. BBC News. Apr. 4, 2012 (Apr. 4, 2012). Accessed via https://www.bbc.com/news/technology-17618495 (Year: 2012).*

(Continued)

*Primary Examiner* — Allison G Wood
(74) *Attorney, Agent, or Firm* — FIG. 1 Patents

(57) ABSTRACT

A system described herein uses data obtained from a wearable device of a first user to identify a second user and/or to determine that the first user is within a threshold distance of the second user. The system can then access an account of the second user to identify one or more items and retrieve model data for the item(s). The system causes the wearable device of the first user to render, for display in an immersive 3D environment (e.g., an augmented reality environment), an item associated with the account of the second user. The item can be rendered for display at a location on a display that is proximate to the second user (e.g., within a threshold distance of the second user) such that the item graphically corresponds to the second user. The item rendered for display may be an item of interest to the first user.

20 Claims, 13 Drawing Sheets

(51) Int. Cl.
*G06Q 30/00* (2012.01)
*G06V 20/20* (2022.01)
*G06V 40/16* (2022.01)

(52) U.S. Cl.
CPC ..... *G06Q 30/0241* (2013.01); *G06Q 30/0278* (2013.01); *G06Q 30/06* (2013.01); *G06Q 30/0601* (2013.01); *G06Q 30/0603* (2013.01); *G06Q 30/0627* (2013.01); *G06Q 30/0631* (2013.01); *G06V 20/20* (2022.01); *G06V 40/172* (2022.01); *G06T 2215/16* (2013.01)

(58) Field of Classification Search
CPC ............... G06Q 30/0278; G06Q 30/06; G06Q 30/0603; G06Q 30/0627; G06Q 30/0631; G06Q 30/0267; G06Q 30/0611; G06Q 30/0621; G06Q 30/0633; G06Q 30/08; G06Q 10/087; G06V 20/20; G06V 20/64; G06V 40/172; G06V 2201/09; G06T 2215/16; G06T 19/006; G06T 15/04; G06T 15/10; G06F 3/167; G06F 1/163; G06F 16/532; G06F 16/58; G06N 20/00
USPC ................................................ 705/26.1–27.2
See application file for complete search history.

(56) References Cited

U.S. PATENT DOCUMENTS

| | | | |
|---|---|---|---|
| 6,813,612 B1 | 11/2004 | Rabenold et al. | |
| 8,223,156 B2 | 7/2012 | Boss et al. | |
| 8,285,638 B2 | 10/2012 | Jung et al. | |
| 8,924,880 B2 | 12/2014 | Altberg et al. | |
| 8,965,460 B1 | 2/2015 | Rao et al. | |
| 9,111,285 B2 | 8/2015 | Amidon et al. | |
| 9,286,727 B2 | 3/2016 | Kim et al. | |
| 9,336,541 B2 | 5/2016 | Pugazhendhi et al. | |
| 9,449,342 B2 | 9/2016 | Sacco | |
| 9,588,342 B2* | 3/2017 | Grigg | H04W 4/21 |
| 9,870,716 B1 | 1/2018 | Rao et al. | |
| 9,904,946 B2* | 2/2018 | Ellison | G06Q 30/0641 |
| 9,921,641 B1 | 3/2018 | Worley, III et al. | |
| 9,996,972 B1 | 6/2018 | Worley, III et al. | |
| 10,008,037 B1 | 6/2018 | Worley, III et al. | |
| 10,163,271 B1 | 12/2018 | Powers et al. | |
| 10,509,962 B2 | 12/2019 | Zheng et al. | |
| 10,891,685 B2 | 1/2021 | Yankovich et al. | |
| 11,080,780 B2 | 8/2021 | Yankovich | |
| 11,200,617 B2 | 12/2021 | Yankovich et al. | |
| 2002/0128952 A1 | 9/2002 | Melkomian et al. | |
| 2003/0126068 A1 | 7/2003 | Hauk et al. | |
| 2005/0119963 A1 | 6/2005 | Ko | |
| 2008/0091692 A1 | 4/2008 | Keith et al. | |
| 2008/0147566 A1 | 6/2008 | Malik | |
| 2008/0208749 A1 | 8/2008 | Wallace et al. | |
| 2009/0055285 A1* | 2/2009 | Law | G06Q 30/0609 705/26.35 |
| 2009/0063983 A1 | 3/2009 | Amidon et al. | |
| 2010/0079467 A1 | 4/2010 | Boss et al. | |
| 2010/0125525 A1 | 5/2010 | Inamdar | |
| 2010/0191578 A1 | 7/2010 | Tran et al. | |
| 2010/0235715 A1 | 9/2010 | Thatcher et al. | |
| 2011/0040645 A1 | 2/2011 | Rabenold et al. | |
| 2011/0072367 A1 | 3/2011 | Bauer | |
| 2011/0270701 A1 | 11/2011 | Black et al. | |
| 2011/0295722 A1 | 12/2011 | Reisman | |
| 2012/0084168 A1 | 4/2012 | Adair et al. | |
| 2012/0084169 A1 | 4/2012 | Adair et al. | |
| 2012/0246036 A1 | 9/2012 | Marr et al. | |
| 2013/0159110 A1 | 6/2013 | Rajaram et al. | |
| 2013/0257877 A1 | 10/2013 | Davis | |
| 2013/0293530 A1 | 11/2013 | Perez et al. | |
| 2013/0293580 A1 | 11/2013 | Spivack | |
| 2014/0040004 A1 | 2/2014 | Hamo et al. | |
| 2014/0058812 A1 | 2/2014 | Bender et al. | |
| 2014/0100991 A1 | 4/2014 | Lenahan et al. | |
| 2014/0130076 A1 | 5/2014 | Moore et al. | |
| 2014/0143081 A1 | 5/2014 | Finkelstein et al. | |
| 2014/0164282 A1* | 6/2014 | Asbury | G06Q 30/0201 705/345 |
| 2014/0172570 A1 | 6/2014 | Areas et al. | |
| 2014/0214547 A1 | 7/2014 | Signorelli et al. | |
| 2014/0267228 A1 | 9/2014 | Ofek et al. | |
| 2014/0267311 A1 | 9/2014 | Evertt et al. | |
| 2014/0279164 A1 | 9/2014 | Friedman | |
| 2014/0279263 A1 | 9/2014 | Liu et al. | |
| 2014/0282220 A1 | 9/2014 | Wantland et al. | |
| 2014/0306994 A1* | 10/2014 | Brown | G06F 3/011 345/633 |
| 2015/0070347 A1 | 3/2015 | Hofmann et al. | |
| 2015/0073907 A1 | 3/2015 | Purves et al. | |
| 2015/0294385 A1 | 10/2015 | Grigg et al. | |
| 2015/0356774 A1 | 12/2015 | Gal | |
| 2015/0379460 A1 | 12/2015 | Zamer | |
| 2016/0012475 A1 | 1/2016 | Liu | |
| 2016/0189426 A1 | 6/2016 | Thomas et al. | |
| 2016/0275723 A1 | 9/2016 | Singh | |
| 2016/0378861 A1 | 12/2016 | Eledath et al. | |
| 2017/0076345 A1* | 3/2017 | Pan | H04L 67/22 |
| 2017/0091844 A1 | 3/2017 | Yarvis et al. | |
| 2017/0132841 A1 | 5/2017 | Morrison | |
| 2017/0256096 A1 | 9/2017 | Faaborg et al. | |
| 2017/0346776 A1* | 11/2017 | Valla | H04L 51/28 |
| 2017/0358138 A1 | 12/2017 | Dack et al. | |
| 2018/0006990 A1* | 1/2018 | Munemann | H04L 51/32 |
| 2018/0096528 A1 | 4/2018 | Needham | |
| 2018/0114329 A1 | 4/2018 | Wexler et al. | |
| 2018/0114372 A1 | 4/2018 | Nagy et al. | |
| 2018/0181997 A1 | 6/2018 | Sanjeevaiah et al. | |
| 2018/0204173 A1 | 7/2018 | Painter et al. | |
| 2018/0336732 A1 | 11/2018 | Schuster | |
| 2019/0080171 A1 | 3/2019 | Zheng et al. | |
| 2019/0156377 A1 | 5/2019 | Yankovich et al. | |
| 2019/0156393 A1 | 5/2019 | Yankovich | |
| 2019/0156410 A1 | 5/2019 | Yankovich et al. | |
| 2019/0156582 A1 | 5/2019 | Yankovich et al. | |
| 2020/0065588 A1 | 2/2020 | Zheng et al. | |
| 2021/0073901 A1 | 3/2021 | Yankovich et al. | |
| 2021/0319502 A1 | 10/2021 | Yankovich | |

FOREIGN PATENT DOCUMENTS

| | | |
|---|---|---|
| WO | 2001/075731 A1 | 10/2001 |
| WO | 2012/044680 A1 | 4/2012 |
| WO | 2013/063299 A1 | 5/2013 |
| WO | 2013/166360 A2 | 11/2013 |
| WO | 2016/118339 A1 | 7/2016 |
| WO | 2016/210354 A1 | 12/2016 |
| WO | 2018/108536 A1 | 6/2018 |
| WO | 2019/055352 A1 | 3/2019 |
| WO | 2019/099581 A1 | 5/2019 |
| WO | 2019/099585 A1 | 5/2019 |
| WO | 2019/099590 A1 | 5/2019 |
| WO | 2019/099591 A1 | 5/2019 |
| WO | 2019/099593 A1 | 5/2019 |

OTHER PUBLICATIONS

Heath, Nick. Five Ways Augmented Reality Will Transform Your Business. Feb. 1, 2016. Published by ZDNet. Accessed via https://www.zdnet.com/article/five-ways-augmented-reality-will-transform-your-business/ (Year: 2016).*
Applicant Initiated Interview Summary Received for U.S. Appl. No. 16/189,720, dated Sep. 4, 2020, 3 pages.
Non-Final Office Action Received for U.S. Appl. No. 16/189,674, dated Aug. 18, 2020, 16 pages.
Advisory Action Received for U.S. Appl. No. 16/189,720, dated Jul. 14, 2020, 3 Pages.
Applicant Initiated Interview Summary Received for U.S. Appl. No. 16/189,720, dated Jun. 29, 2020, 3 Pages.
Non-Final Office Action Received for U.S. Appl. No. 16/189,720, dated Aug. 5, 2020, 10 Pages.

(56) References Cited

OTHER PUBLICATIONS

Response to Final Office Action filed on Jul. 6, 2020 for U.S. Appl. No. 16/189,720, dated May 19, 2020, 13 pages.
Response to Non-Final Office Action filed on Aug. 31, 2020 for U.S. Appl. No. 16/189,720, dated Aug. 5, 2020, 8 pages.
Applicant Initiated Interview Summary Received for U.S. Appl. No. 16/189,849, dated Jul. 22, 2020, 3 Pages.
Response to Non-Final Office Action filed on Jul. 28, 2020 for U.S. Appl. No. 16/189,849, dated Apr. 29, 2020, 21 Pages.
Non-Final Office Action Received for U.S. Appl. No. 16/189,720, dated Jan. 30, 2020, 12 pages.
Applicant Initiated Interview Summary Received for U.S. Appl. No. 16/189,720, dated Apr. 17, 2020, 3 pages.
Final Office Action Received for U.S. Appl. No. 16/189,720, dated May 19, 2020, 16 pages.
Response to Non-Final Office Action filed on Apr. 28, 2020 for U.S. Appl. No. 16/189,720, dated Jan. 30, 2020, 12 pages.
Non Final Office Action Received for U.S. Appl. No. 16/189,849, dated Apr. 29, 2020, 43 pages.
International Preliminary Report on Patentability Received for Application No. PCT/US2018/061139, dated May 28, 2020, 9 pages.
International Preliminary Report on Patentability received for PCT Application No. PCT/US2018/061145, dated May 28, 2020, 10 pages.
International Preliminary Report on Patentability received for PCT Application No. PCT/US2018/061151, dated May 28, 2020, 9 pages.
International Preliminary Report on Patentability Received for Application No. PCT/US2018/061152, dated May 28, 2020, 7 pages.
International Preliminary Report on Patentability received for PCT Application No. PCT/US2018/061154, dated May 28, 2020, 9 pages.
International Search Report received for PCT Application No. PCT/US2018/061139, dated Feb. 14, 2019, 4 pages.
Written Opinion received for PCT Patent Application No. PCT/US2018/061139, dated Feb. 14, 2019, 7 pages.
International Search Report received for PCT Application No. PCT/US2018/061145, dated Feb. 14, 2019, 4 pages.
International Search Report received for PCT Application No. PCT/US2018/061151, dated May 2, 2019, 3 pages.
Written Opinion received for PCT Patent Application No. PCT/US2018/061151, dated May 2, 2019, 7 pages.
International Search Report received for PCT Application No. PCT/US2018/061152, dated Feb. 4, 2019, 3 pages.
Written Opinion received for PCT Patent Application No. PCT/US2018/061152, dated Feb. 4, 2019, 5 pages.
International Search Report received for PCT Application No. PCT/US2018/061154, dated Feb. 14, 2019, 4 pages.
Written Opinion received for PCT Patent Application No. PCT/US2018/061154, dated Feb. 14, 2019, 7 pages.
Xu, et al., Constraint-Based Automatic Placement for Scene Composition, Proceedings of Graphics Interface 2002, Jan. 1, 2002, 10 pages.
Written Opinion received for PCT Patent Application No. PCT/US2018/061145, dated Feb. 14, 2019, 8 pages.
Final Office Action received for U.S. Appl. No. 16/189,674, dated Dec. 31, 2020, 14 pages.
Corrected Notice of Allowability received for U.S. Appl. No. 16/189,720, dated Dec. 16, 2020, 2 pages.
Applicant Initiated Interview summary received for U.S. Appl. No. 16/189,674 dated Nov. 2, 2020, 3 pages.
Response to Non-Final Office Action filed on Oct. 28, 2020 for U.S. Appl. No. 16/189,674, dated Aug. 18, 2020, 11 pages.
Corrected Notice of Allowability Received for U.S. Appl. No. 16/189,720, dated Nov. 9, 2020, 2 pages.
Notice of Allowance received for U.S. Appl. No. 16/189,720, dated Oct. 9, 2020, 9 Pages.
Non Final Office Action Received for U.S. Appl. No. 16/189,776, dated Nov. 10, 2020, 23 pages.
Final Office Action Received for U.S. Appl. No. 16/189,849, dated Sep. 16, 2020, 57 Pages.
Final Office Action Received for U.S. Appl. No. 17/102,283, dated Jul. 28, 2021, 12 pages.
Final Office Action received for U.S. Appl. No. 16/189,776, dated Feb. 25, 2021, 27 Pages.
Notice of Allowance Received for U.S. Appl. No. 16/189,674, dated May 19, 2021, 10 pages.
Supplemental Notice of Allowability Received for U.S. Appl. No. 16/189,674, dated Jun. 28, 2021, 2 Pages.
Supplemental Notice of Allowability Received for U.S. Appl. No. 16/189,674, dated Jun. 8, 2021, 2 Pages.
Non Final Office Action Received for U.S. Appl. No. 16/189,776, dated Jun. 7, 2021, 30 Pages.
Non Final Office Action Received for U.S. Appl. No. 17/102,283, dated Jun. 30, 2021, 23 pages.
Hosoya et al., "A Mirror Metaphor Interaction System: Touching Remote Real Objects in an Augmented Reality Environment", Proceedings of the Second IEEE and ACM International Symposium on Mixed and Augmented Reality (ISMAR), 2003, 2 Pages.
Hurst et al., "Gesture-based interaction via finger tracking for mobile augmented reality", Multimedia Tools and Applications, vol. 62, 2013, pp. 233-258.
He, "Construction of User Preference Profile in a Personalized Image Retrieval", International Conference on Neural Networks and Signal Processing, Jun. 8-10, 2008, pp. 434-439.
Notice of Allowance Received for U.S. Appl. No. 17/102,283, dated Nov. 1, 2021, 9 Pages.
Office Action received for Korean Patent Application No. 10-2020-7013835, dated Aug. 24, 2021, 8 pages (2 pages of English translation and 6 pages of official copy).
Final Office Action received for U.S. Appl. No. 16/189,776, dated Sep. 24, 2021, 30 pages.
Notice of Allowance Received for U.S. Appl. No. 17/102,283, dated Sep. 8, 2021, 9 Pages.
U.S. Appl. No. 62/558,836, Camera Platform and Object Inventory Control, filed Sep. 14, 2017, 51 pages.
Corrected Notice of Allowability Received for U.S. Appl. No. 17/102,283, dated Nov. 18, 2021, 2 Pages.
10-2020-7013835 , "Office Action Received for Korean Patent Application No. 10-2020-7013835 dated Feb. 11, 2022", dated Feb. 11, 2022, 6 pages.
U.S. Appl. No. 16/189,776, "Examiner's Answer", U.S. Appl No 16/189,776, filed Jun. 13, 2022, 15 pages.
18814749.0 , "Communication Pursuant to Article 94(3) EPC", EU Application No. 18814749.0, dated Apr. 25, 2022, 7 pages.
10-2020-7013835 , "Notice of Allowance received for Korean Patent Application No. 10-2020-7013835, dated Jul. 15, 2022", Jul. 15, 2022, 3 Pages.
10-2020-7013835 , "Written Decision on Registration", KR Application No. 10-2020-7013835, dated Jul. 15, 2022, 4 pages.
U.S. Appl. No. 17/358,615, "Non-Final Office Action", U.S. Appl. No. 17/358,615, dated Aug. 29, 2022, 9 pages.

* cited by examiner

METHOD, SYSTEM, AND COMPUTER-READABLE STORAGE MEDIA FOR RENDERING OF OBJECT DATA BASED ON RECOGNITION AND/OR LOCATION MATCHING

CROSS-REFERENCE TO RELATED APPLICATIONS

This application claims the benefit of and priority to U.S. Provisional Application No. 62/588,189, filed Nov. 17, 2017 and entitled "Augmented Reality, Mixed Reality, and Virtual Reality Experiences," the entire contents of which are incorporated herein by reference.

BACKGROUND

Conventionally, a user can view an item of interest via a web site on a display screen in a two-dimensional ("2D") environment. For instance, the user may be researching information about the item, or even further, the user may be interested in acquiring the item. In these types of scenarios, the user experience is most likely limited to an online experience. In other words, these types of scenarios typically lack the ability for personal interactions (e.g., a face-to-face conversation) between the user and a source (e.g., another user) with knowledge of the item. Accordingly, the user may spend a considerable amount of time trying to find and research an item online. This, in turn, can result in unnecessary utilization of computing resources such as processing cycles, memory, and network bandwidth.

A wearable device has the ability to display virtual content to a user, in an augmented reality ("AR") environment, as the user goes about a day's activity (e.g., walks to the bus stop, eats in a restaurant, shops in a store, etc.). As use of wearable devices becomes more prevalent, it has become difficult to effectively display virtual content that is of interest to the user. That is, conventional wearable devices lack the ability to effectively display a model of an object (e.g., an item) at an appropriate time and/or at an appropriate location, particularly given a situation where a user wearing the wearable device happens to be physically proximate to a source (e.g., another user, a physical structure, etc.) associated with the item.

Consequently, the user can become confused when viewing a model of an item that has been rendered at an inappropriate time and/or at an inappropriate location in an AR environment. This might, in turn, result in inadvertent or incorrect user input to the wearable device rendering the environment. Inadvertent or incorrect user input can also unnecessarily utilize computing resources such as processing cycles, memory, and network bandwidth.

It is with respect to these and other technical challenges that the disclosure made herein is presented.

SUMMARY

The techniques described herein identify opportunities to render and display relevant model data as a user casually wears a wearable device while performing a day's activities. In order to address the technical problems described briefly above, and potentially others, the disclosed technologies can determine an appropriate time at which to display an item of interest to the user and/or an appropriate location on a display of the wearable device at which to display the item of interest to the user.

In various embodiments described herein, the techniques enable an experience that can lead to personal interactions (e.g., a face-to-face conversation) between a first user wearing a wearable device and a source, such as a second user, with knowledge of an item that is of interest to the first user. For example, the item may include: an item the second user currently has for sale via an electronic-commerce ("e-commerce") site associated with an electronic marketplace, an item the second user is currently interested in acquiring via the e-commerce site (e.g., an item on an interest list such as a "wish" list or a "watch" list), an item the second user recently purchased via the e-commerce site (e.g., an item purchased in the last week, the last month, the last year, etc.), an item for which the second user has provided a review via the e-commerce site, and/or an item the second user has recently used. Accordingly, the item is an item with which the second user is familiar (e.g., the second user likely has information about the item that may be of value to the first user).

In various examples, the disclosed technologies can use facial recognition and/or location information to determine that the first user and the second user are in physical proximity of one another (e.g., within a threshold distance of each other). Based on this determination, the wearable device can render a model of the item for display at an appropriate time and/or at an appropriate location on a display so that the first user knows the item is associated with the second user. For instance, the appropriate time can be when the first user is walking by the second user on the street or when the first user is sitting next to the second the user in a restaurant. The appropriate location on the display can be within a threshold distance of the second user (e.g., close to the head of the second user in the first user's real-world view). As a result of being informed that the second user is in some way familiar with the item, the first user can decide to stop and initiate a personal interaction with the second user regarding the item (e.g., ask the second user a question about the item via a face-to-face conversation).

In some instances, the personal interaction may cause an exchange of the item to occur. That is, the second user may have the item listed for sale via an e-commerce site and the first user may indicate, to the second user, an interest in purchasing the item. After the personal interaction, the first user can implement the purchase via the e-commerce site. Accordingly, the techniques described herein can provide a seamless transition from an online item browsing and shopping experience to a personal item browsing and shopping experience between a potential buyer and a seller of an item.

Aspects of the technologies disclosed herein can be implemented by a wearable device, such as an AR device. For example, a user of such a device might provide input indicating an interest to enter or activate a mode enabling the rendering of model data of items associated with other users as the user wearing the wearable device casually goes about a day's activities. Moreover, the other users that are proximate to the user may be required to provide authorization to have items (e.g., items associated with an account of an e-commerce site) displayed to the user wearing the wearable device. In some examples, a three-dimensional ("3D") model of the item can be rendered by the wearable device (e.g., a high-resolution 3D model, a low fidelity 3D model, etc.). In other examples, a two-dimensional ("2D") model or representation of the item can be rendered by the wearable device (e.g., a photograph of an item, an image of the item, etc.).

In various embodiments, the system described herein can use data obtained from a wearable device of a first user to recognize a face of a second user and/or to determine an identity of the second user. Based on the recognition and/or the determined identity, the system can access an account associated with the second user to identify one or more items and retrieve model data (e.g., 3D or 2D model data) for the one or more items. The system can then cause the wearable device of the first user to render, for display in an immersive 3D environment (e.g., an AR environment), an item associated with the account of the second user. The item can be rendered for display at a location on a display that is proximate to the second user (e.g., within a threshold distance of the second user) such that the item graphically corresponds to the second user. A graphical correspondence helps make it clear, to the first user, that the item is associated with the second user. For example, the item can be displayed close to the second user's head so the first user can see which items the second user currently has for sale via the e-commerce site. In another example, a virtual connection (e.g., a line or an arrow) between an item and the second user can be rendered on the display.

In some examples, an item rendered for display via the wearable device of the first user is an item determined to be of interest to the first user. The system can determine an item in which the first user is interested by accessing an account of the first user and analyzing an e-commerce browsing history or retrieving an item interest list for the first user (e.g., a wish list or a watch list). The system can then determine a match between an item associated with the account of the second user and an item associated with the e-commerce browsing history of the first user or an item on the item interest list for the first user. A match can be an exact match where all the characteristics of the item are the same (e.g., a type of the item, a model of the item, a manufacturer of the item, a color of the item, a size of the item, a material of the item, etc.). Alternatively, a match can be a general match where only a subset of the characteristics of the item need to be the same (e.g., a type and a size of the item need to be the same but the color can be different). In some examples, the first user can define which characteristics must be the same for a match to occur and/or which characteristics can vary for the match to occur.

Consequently, as a condition for display, the system can determine a matching item for which both the first user and the second user have a common interest (e.g., the second user is selling the item via an e-commerce site and the first user is interested in purchasing the item, or vice versa), and based on the rendering of the model data of the item via the wearable device, a personal interaction, such as a face-to-face conversation, between the first user and the second user can occur. In many cases, the first user and the second user may not even know each other. Rather, they may be two people that have a common interest in an item and that happen to be physically located close to one another at a given time.

In additional examples, the system can determine items in which the first user is interested via other mechanisms as well. In contrast to the examples described above, these mechanisms may not be specific to an e-commerce account. For example, a wearable device can collect and analyze signals to determine an interest in an item. The signals can be explicitly determined based on user input such as a browser history (e.g., Web sites a user visits), a search history (e.g., search queries submitted a user), social media activity (e.g., social media pages a user follows, events liked by the user, etc.), and so forth. Alternatively, the signals can be implicitly determined (e.g., passive signals) based on a direction of an eye gaze (e.g., looking at a particular item), a duration of an eye gaze (e.g., looking at a particular item for an extended period of time), and so forth.

As described above, the system can determine close proximity between two users based on image data of a surrounding real-world environment obtained from the wearable device (e.g., recognizable facial data). In additional or alternative embodiments, location information can be used by the system to determine that the first user and the second user are close to one another (e.g., within a threshold distance such as five feet, ten feet, twenty feet, etc.). For example, the system can receive and/or track location data associated with (i) the wearable device being worn by the first user and/or (ii) a device associated with the second user. The system can use the location data to determine that the first user and the second user are close to one another, or within the threshold distance of one another. The items can be retrieved and rendered for display based on this determination as well.

While the examples provided above describe a second user as a source of an item to be displayed via the wearable device of the first user, the techniques can additionally or alternatively recognize and/or determine other sources of items. For example, a source can include a physical structure. The physical structure can be a house of a user selling one or more items. Or, the physical structure can be a brick-and-mortar retail store that sells one or more items. Accordingly, as a user wearing a wearable device is walking by a physical structure, the techniques described herein can recognize the physical structure, associate the physical structure with an account (e.g., a user account, a merchant account, etc.), and display items associated with the account so that they graphically correspond to the physical structure as the user walks by the physical structure. Moreover, the system can also or alternatively determine close proximity between the user and the physical structure using location information. For example, the system can receive and/or track location data associated with the wearable device being worn by the user and compare the location data of the wearable device to known location data of a physical structure (e.g., a post mail address) to determine the user is within a threshold distance of the physical structure.

Through implementations of the disclosed technologies, 2D and/or 3D models of items can be rendered at appropriate times and/or appropriate locations within different AR environments. This addresses the technical challenges encountered when transitioning from an online item browsing and shopping experience to a 3D immersive item browsing and shopping experience that is enabled via the wearable device. Moreover, the disclosed technologies improve a user experience by identifying relevant opportunities to display content that is of particular interest to the users. In this way, the disclosed technologies tangibly improve computing efficiencies with respect to a wide variety of computing resources that would otherwise be consumed and/or utilized by improving human-computer interaction and by reducing the amount of processing cycles and storage required by previous solutions. Technical benefits other than those specifically identified herein might also be realized through implementations of the disclosed technologies.

It should be appreciated that the above-described subject matter can be implemented as a computer-controlled apparatus, a computer-implemented method, a computing device, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

This Detailed Description describes technologies for rendering models of items at the appropriate time and/or at the appropriate location on a display of a wearable device based on recognition and/or location data. As discussed briefly above, the disclosed technologies improve computing efficiencies with respect to a wide variety of computing resources that would otherwise be consumed and/or utilized by improving human-computer interaction and by reducing the amount of processing cycles and storage required by previous solutions.

As described herein, the disclosed technologies provide a seamless transition from an online experience to a personal, interactive experience between two users. That is, a first user that casually encounters a second user (e.g., walks by the second user on a sidewalk, sits next to the second user on the bus, etc.) while wearing a wearable device can be informed of items associated with an account of the second user. These techniques provide the ability for the first user and the second user, who are close in physical proximity, to stop and interact with each other regarding an item. For instance, a potential buyer of an item can personally ask a seller of the item a question. Or a potential buyer of an item can personally ask another person who recently bought the same item about his or her experiences with the item, etc. Referring now to the FIGS., technologies for efficiently rendering models of items based on recognition and/or location data will be described.

Figure 1:
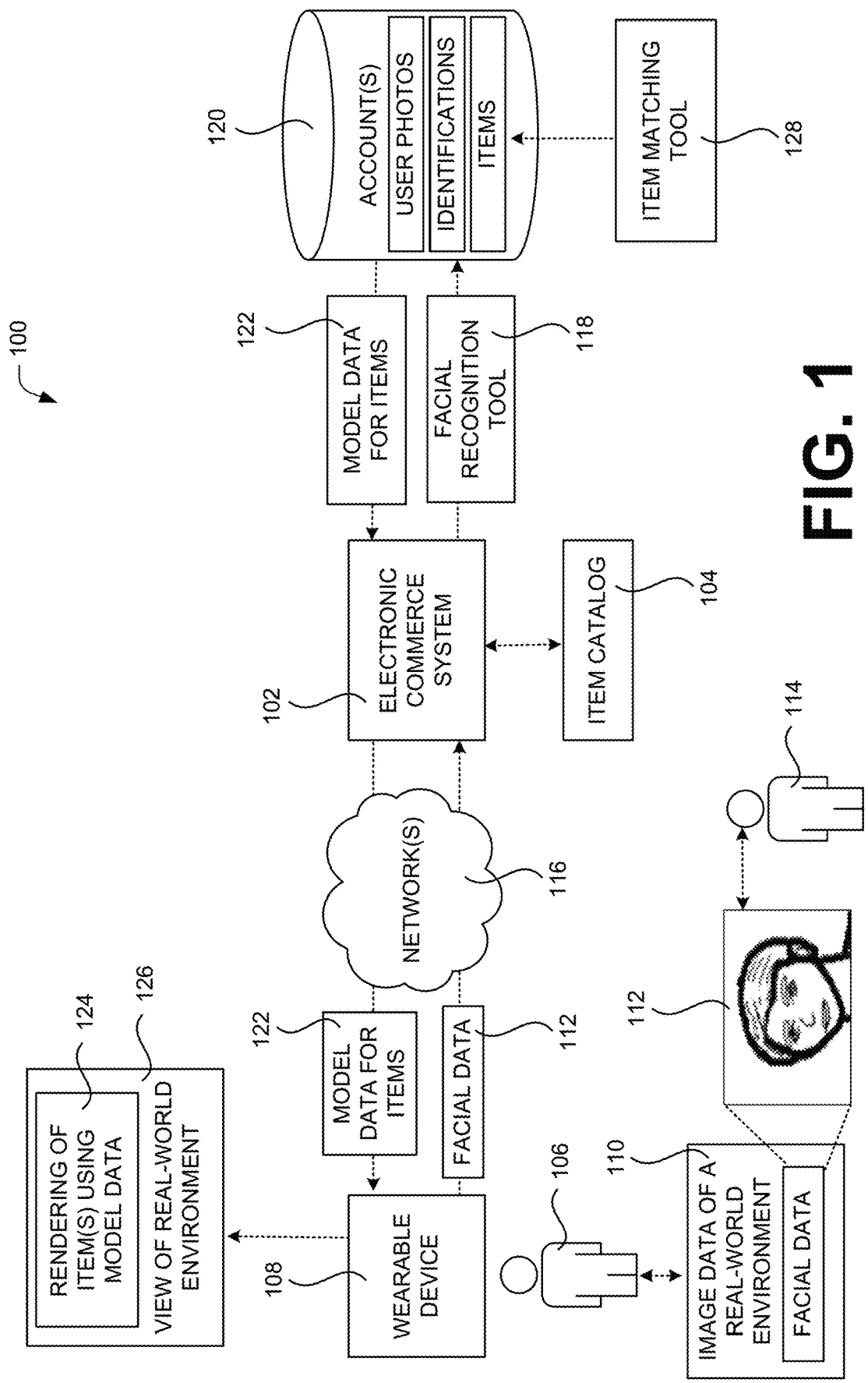
FIG. 1 illustrates aspects of an exemplary environment in which a system can cause models of items to be rendered, for display, based on facial recognition.

FIG. 1 illustrates aspects of an exemplary environment 100 in which a system can cause models of items to be rendered, for display, based on facial recognition. As illustrated, the exemplary system may comprise an e-commerce system 102 that includes an item catalog 104 where users can list real-world items for sale. A real-world item can be any type of item including, but not limited to, electronics, home goods, automobiles or automotive parts, clothing, musical instruments, art, jewelry, and so forth. The e-commerce system 102 can be implemented on one or more server computers operating in conjunction with of an e-commerce site.

A first user 106 can utilize a wearable device 108, such as that described in further detail below with respect to FIG. 12, to obtain image data 110 of a real-world environment in which the first user 106 is currently located. For instance, the wearable device 108 can include an optical device configured to scan the real-world environment of the first user 106 to obtain the image data. In various examples, the image data 110 of the real-world environment includes facial data 112 of a second user 114 that is physically proximate to the first user 106 (e.g., within a threshold distance of the first user 106). In some implementations, the scan performed by the optical device can focus on obtaining facial data of people that are close to the first user 106.

Using a connection over network(s) 116, the wearable device 108 transmits the facial data 112 to the e-commerce system 102. The e-commerce system 102 uses a facial recognition tool 118 (e.g., a software component or module) to apply facial recognition techniques to the facial data 112. For example, the facial recognition techniques can compare the facial data 112 to a series of user photos maintained in association with various accounts 120 (e.g., e-commerce accounts). Based on the comparison of the obtained facial data to facial characteristics in the user photos, an identity of the second user 114 can be determined and items associated with an account 120 of the second user 114 can be identified.

As described above, the items can include: items the second user currently has for sale via an e-commerce site operated by the e-commerce system 102 (e.g., items listed in the item catalog 104), items the second user is currently interested in, items the second user recently purchased via the e-commerce site, items for which the second user has provided reviews via the e-commerce site, items the second user recently used, and so forth. Accordingly, the identified items are items with which the second user is familiar.

Figure 5:
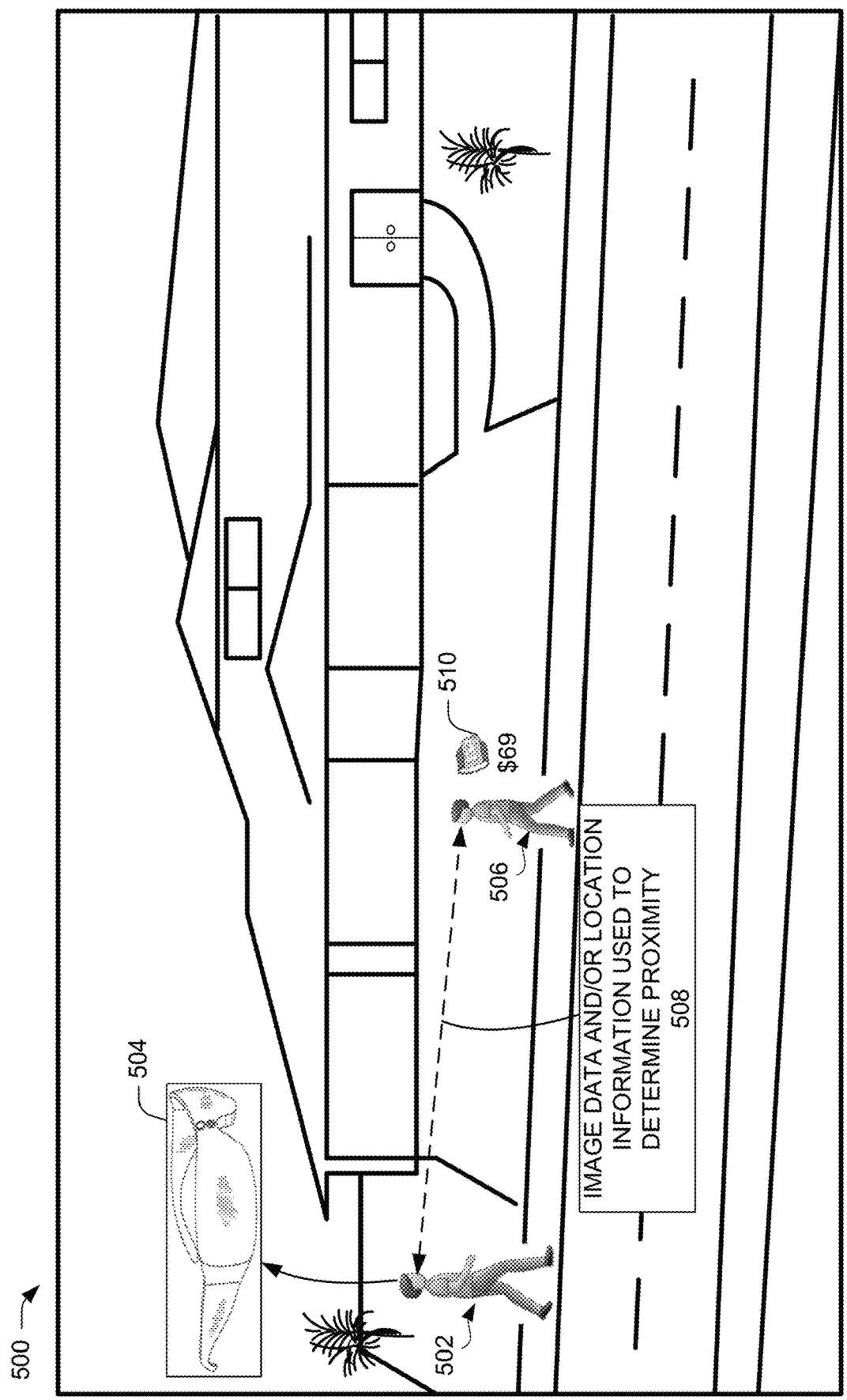
FIG. 5 illustrates an example scenario in which a wearable device can display a rendering of an item in a user's view of a real-world environment based on facial recognition and/or location matching.

The e-commerce system 102 then retrieves model data 122 for the identified items and causes the model data 122 to be rendered for display via the wearable device 108 of the first user 106. That is, the e-commerce system 102 transmits the model data 122 to the wearable device 108 so that the wearable device 108 can display a rendering of the items 124, using the model data, in a view of the real-world environment 126 of the first user 106. The model data 122 can comprise 3D model data so the wearable device can render a high-resolution 3D model of the item, a low fidelity 3D model of the item, etc. Alternatively, the model data 122 can comprise 2D model data such as a photograph or image of the item. In various examples, the rendering of the items 124 graphically correspond to the second user 114 in the view of the real-world environment 126 of the first user 106. An example of this is illustrated in FIG. 5.

In additional examples, item metadata can be displayed with the rendering of the items 124. The item metadata can include, but is not limited to: a name of the item, a description of the item (e.g., characteristics such as a manufacturer, a model, a size, etc.), a price for the item, an item category in which a listing is placed, and so forth.

In various embodiments, the e-commerce system 102 can include an item matching tool 128 (e.g., a software component or module). The item matching tool 128 is configured to ensure that the items associated with the account 120 of the second user 114 which are displayed via the wearable device 108 are items in which the first user 106 has an interest. For example, the item matching tool 128 can access an account 120 of the first user 106 and analyze an e-commerce browsing history of the first user 106 or retrieve an item interest list for the first user 106 (e.g., a wish list or a watch list). The item matching tool 128 can then determine a match between an item associated with the account 120 of the second user 114 and an item associated with the account 120 the first user 106.

A match can be an exact match where all the characteristics of the item are the same (e.g., a type of the item, a model of the item, a manufacturer of the item, a color of the item, a size of the item, a material of the item, etc.) or a match can be a general match where only a subset of the characteristics of the item need to be the same (e.g., a type and a size of the item need to be the same but the color can be different). In some examples, the first user can define which characteristics must be the same for the match to occur and which characteristics can vary for the match to occur. Consequently, the items displayed to the first user 106 via the wearable device 108 can be items in which the first user 106 is determined to have an interest.

In additional examples, the e-commerce system 102 can determine items in which the first user is interested via other mechanisms as well. These mechanisms may not be specific to an e-commerce account of the first user 106. For instance, the wearable device 108 and/or the e-commerce system 102 can include components that collect and analyze signals to determine an interest in an item. The signals can be explicitly determined based on user input such as a browser history (e.g., Web sites a user visits), a search history (e.g., search queries submitted a user), social media activity (e.g., social media pages a user follows, events liked by the user, etc.), and so forth. Application programming interfaces (APIs) and user authorization may enable an e-commerce application executing on the wearable device 108 to access user activity in other applications and/or to transmit the user activity to the e-commerce system 102.

Alternatively, the signals can be passive signals that are implicitly determined by the wearable device 108 and/or the e-commerce system 102 based on one or more of: a direction of an eye gaze (e.g., looking at a particular item), a duration of an eye gaze (e.g., looking at a particular item for an extended period of time), head movement, body movement, an audible noise (e.g., a spoken word or phrase), etc. Passive signals can continuously be collected and analyzed over a period of time during which a user is wearing the wearable device 108. Consequently, the wearable device 108 includes components (e.g., sensors), or the device interacts with components, configured to track eye gaze and/or detect head and/or body movement so that passive signals can continuously be collected as the user completes everyday activities (e.g., walking down the street, exercising or playing a sport, eating lunch, playing in the yard with kids, cooking in the kitchen, etc.).

To associate the signals with a particular item (e.g., a user looks at a car of a specific make and model), the wearable device 108 and/or the e-commerce system 102 can be configured to perform object recognition techniques. Accordingly, the wearable device 108 can be configured to scan the surrounding environment to locate and identify objects. For example, the operating system of the wearable device 108 and/or an application executing on the wearable device 108 can receive a video stream, mesh data, and/or other types of information to implement object recognition via a variety of techniques.

In a more specific implementation, an interest trigger can be established and used to determine that a user has an interest in an item based on an analysis of the passive signals. An interest trigger can comprise a threshold that must be satisfied before a user's interest in an item is determined by the e-commerce system 102. For example, an analysis of eye gaze direction and/or head movement can determine that a user looks at a particular item for a threshold period of time (e.g., two seconds, three seconds, ten seconds, etc.), where the threshold period of time is established to be the interest trigger. Based on the analysis, the wearable device 108 and/or the e-commerce system 102 can determine that the user is likely interested in the item.

In another example, an analysis of eye gaze direction and/or head movement over a period of time (e.g., a morning, a day, a week, etc.) can determine that a user looks at a particular item a threshold number of times (e.g., three, four, five, etc.), where the threshold number of times is established to be the interest trigger. Again, based on the analysis, the wearable device 108 and/or the e-commerce system 102 can determine that the user is likely interested in the item.

In yet another example, an analysis of body movement can determine that a user moves an arm and points a finger at, or provides a "thumbs up" for, a particular item a threshold number of times and/or for a threshold period of time, where the threshold(s) are established to be the interest trigger. Based on the analysis, the wearable device 108 and/or the e-commerce system 102 can determine that the user is likely interested in the item.

An example of a wearable device 108 can include an augmented reality ("AR") device. An AR device is a computing device capable of providing a view of the real-world environment 126 within which physical objects are augmented or supplemented by computer-generated ("CG") sensory input (e.g., sound, video, graphics, etc.). For instance, an AR device might provide a view of the real-world environment 126 with a rendering 124 of an item as an overlay such that the item appears to be present in the view of real-world environment 126. Additional details regarding the configuration and operation of a wearable device 108 capable of providing this functionality is provided below with regard to FIG. 12. In this regard, it is to be appreciated that the rendering 124 of an item by the wearable device 108 using the model data includes displaying a virtual representation of the item in an AR environment, as well as other types of environments, such as mixed reality ("MR") environments or virtual reality ("VR") environments. It is also to be appreciated that the configurations disclosed herein are not limited to use with an AR device. Rather, the technologies disclosed herein can be utilized with any type of computing device that can provide a view of a real-world environment 126 that includes a rendering 124 of an item.

It is to be further appreciated that the technologies described herein can be implemented on a variety of different types of wearable devices 108 configured with a variety of different operating systems, hardware components, and/or installed applications. In various configurations, for example, the wearable device 108 can be implemented by the following example wearable devices: GOOGLE GLASS, MAGIC LEAP ONE, MICROSOFT HOLOLENS, META 2, SONY SMART EYEGLASS, HTC VIVE, OCULUS GO, PLAYSTATION VR, or WINDOWS mixed reality headsets. Thus, embodiments of the present disclosure can be implemented in any AR-capable device, which is different than goggles or glasses that obstruct a user's view of real-world objects, e.g., actual reality. The techniques described herein are device and/or operating system agnostic.

To implement some of the described techniques on the wearable device 108, a user may be required to enable a feature and/or enter a particular operation mode. For example, the first user 106 may need to provide permission and/or authorization for the wearable device 108 to implement the described techniques. In another example, the second user 114 may need to provide permission and/or authorization for items associated with his or her account 120 to be displayed via the wearable device 108 of the first user 106.

Figure 2:
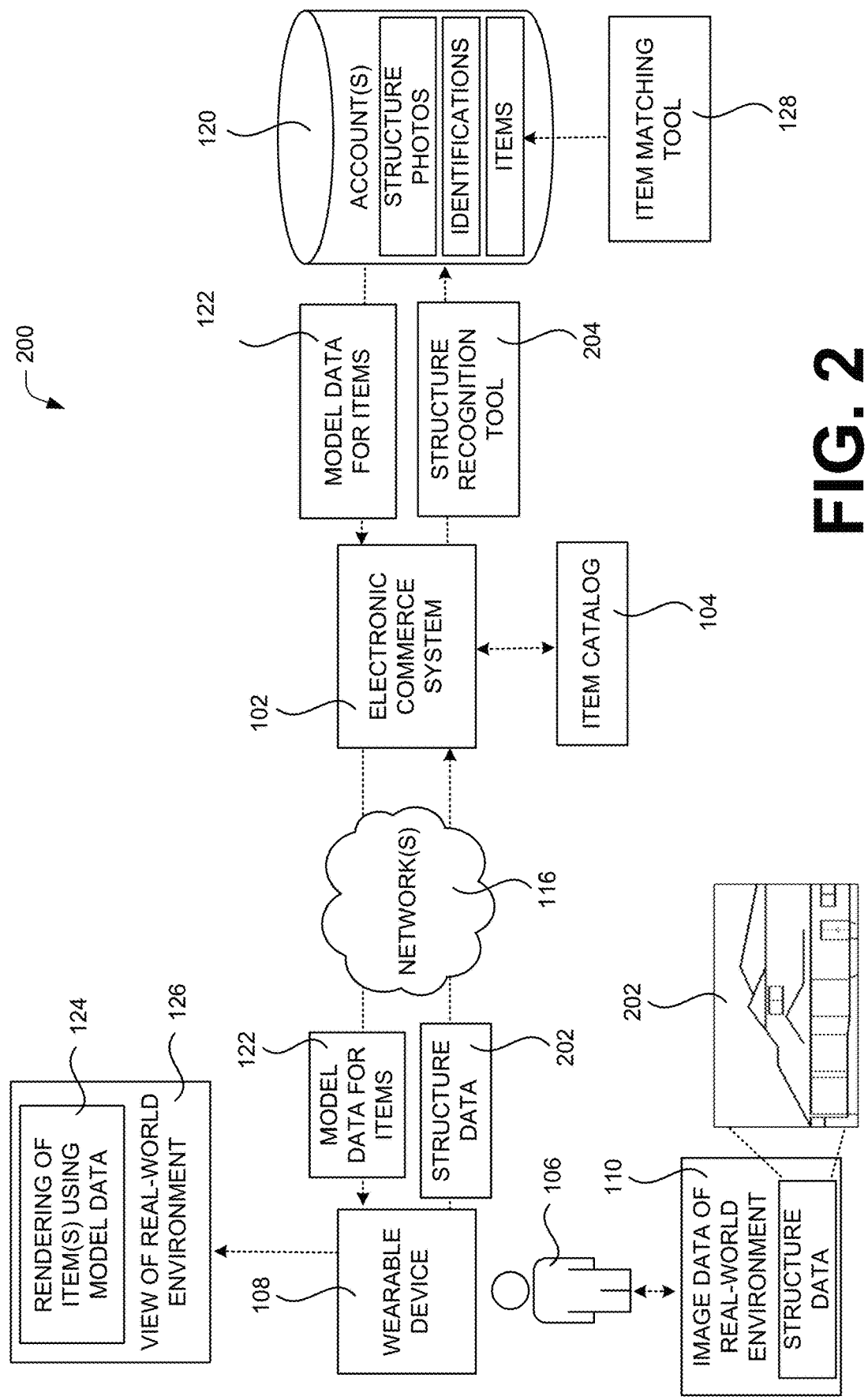
FIG. 2 illustrates aspects of an exemplary environment in which a system can cause models of items to be rendered, for display, based on structure recognition.

Moving on, FIG. 2 illustrates aspects of an exemplary environment 200 in which a system can cause models of items to be rendered, for display, based on structure recognition. The environment 200 of FIG. 2 is similar to the environment 100 in FIG. 1, except that structure data 202 is included in the image data 110 of the real-world environment that is obtained by the wearable device 108 of the first user 106. The structure data 202 captures the geometry of a physical structure (e.g., a user's home, a merchant's brick-and-mortar retail store, etc.). The wearable device 108 transmits the structure data 202 to the e-commerce system 102 over networks 116.

Figure 6:
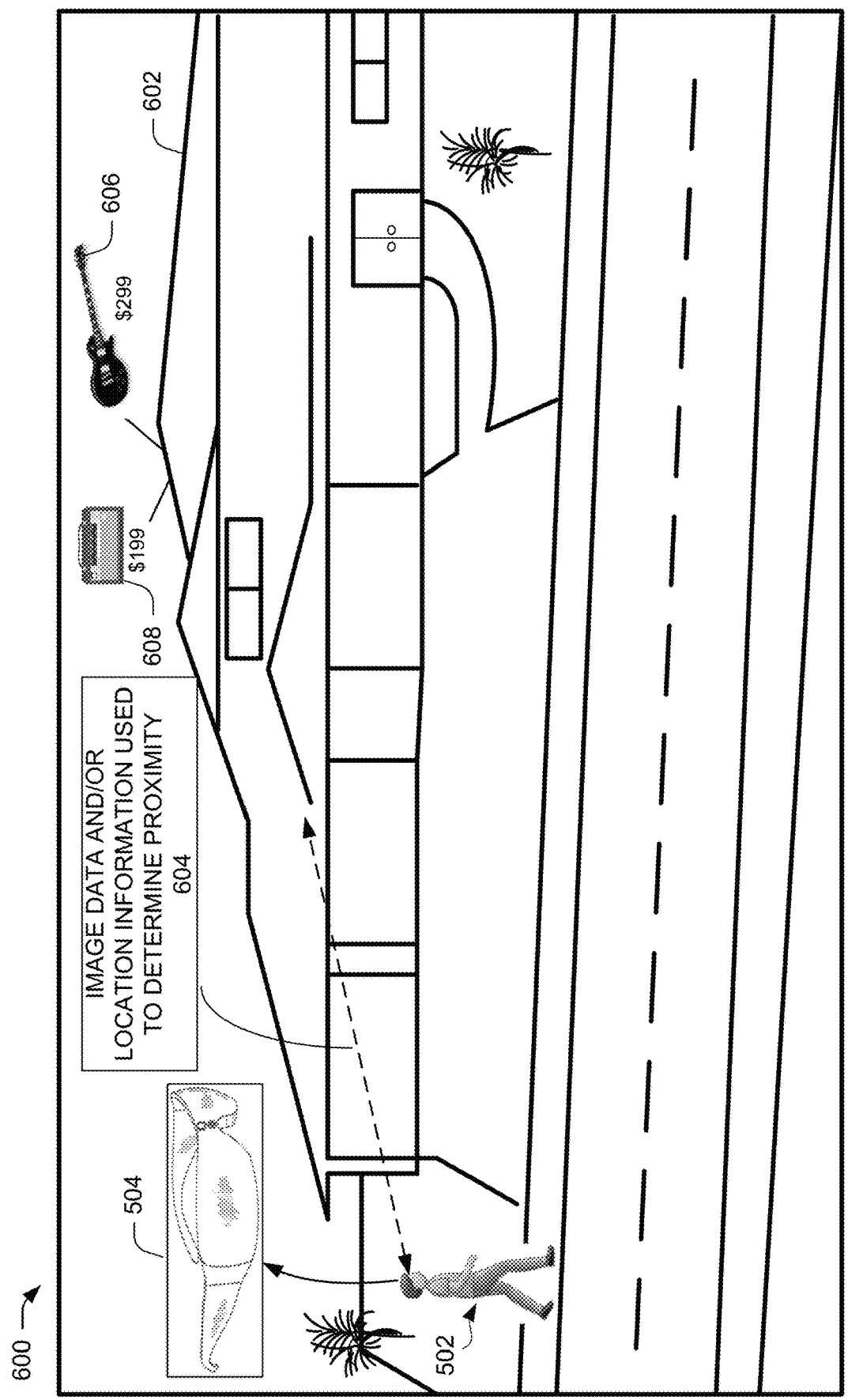
FIG. 6 illustrates an example scenario in which a wearable device can display a rendering of an item in a user's view of a real-world environment based on structure recognition and/or location matching.

The e-commerce system 102 uses a structure recognition tool 204 to apply recognition techniques to the structure data 202. For example, the recognition techniques can compare the structure data 202 to a series of structure photos maintained in association with various accounts 120 (e.g., user e-commerce accounts, merchant e-commerce accounts, etc.). Based on the comparison, a specific account 120 can be identified and items associated with the identified account 120 can be rendered in the view of the real-world environment. An example of this is illustrated in FIG. 6.

As described above with respect to FIGS. 1 and 2, recognition can be used to determine that a user 106 wearing a wearable device 108 is physically proximate to a source of an item, such as another user 114 or a physical structure (e.g., a seller's home, a merchant brick-and-mortar retail store, etc.). Moreover, the recognition can be used to identify the source of the item. Again, the item can be an item the a user or a merchant currently has for sale via an e-commerce site, an item a user is currently interested in acquiring via the e-commerce site (e.g., an item on an interest list such as a "wish" list or a "watch" list), an item a user recently purchased via the e-commerce site (e.g., an item purchased in the last week, the last month, the last year, etc.), an item for which a user has provided a customer review via the e-commerce site, an item a user has recently used, and so forth.

Figure 3:
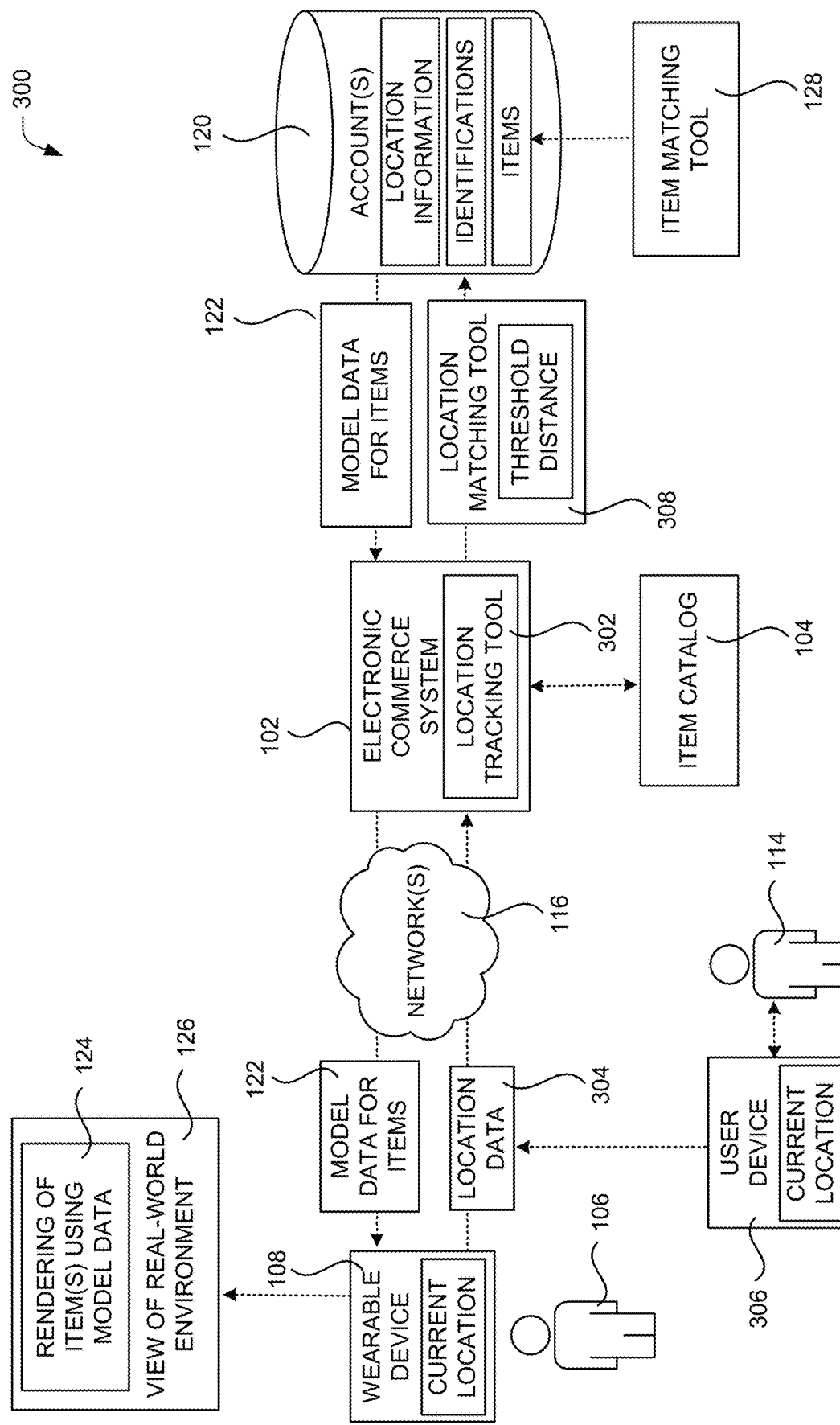
FIG. 3 illustrates aspects of an exemplary environment in which a system can render, for display, models of items using location data.

Alternatively or in addition, location information can be used to determine that the user 106 wearing the wearable device 108 is physically proximate to a source of an item so that the item can be displayed to the user 106 via the wearable device 108. In particular, FIG. 3 illustrates aspects of an exemplary environment 300 in which a system can render, for display, models of items using location data. The location data can be used to render an item for display without using the recognition techniques described above. Or, the location data can be supplemental information used to determine or confirm physical proximity, and thus, can be used to render an item for display in addition to using the recognition techniques described above.

The environment 300 of FIG. 3 is similar to the environments 100, 200 in FIGS. 1 and 2, except that the e-commerce system 102 includes a location tracking tool 302 (e.g., a software component or module) that receives, over network(s) 116, location data 304 that identifies a current location of the wearable device 108 of the first user 106 and/or a user device 306 (e.g., another wearable device, a smartphone, a tablet, etc.) of the second user 114. In various embodiments, the location data 304 is passed to a location matching tool 308 to determine if the two devices are physically proximate to one another, or within a threshold distance. Using this determination based on location information, items associated with an account 120 of the second user 114 can be identified, and model data for the items 122 can be transmitted to the wearable device 108 so a rendering 124 of the items can be displayed to the user 106 in his or her view of the real-world environment 126.

Figure 4:
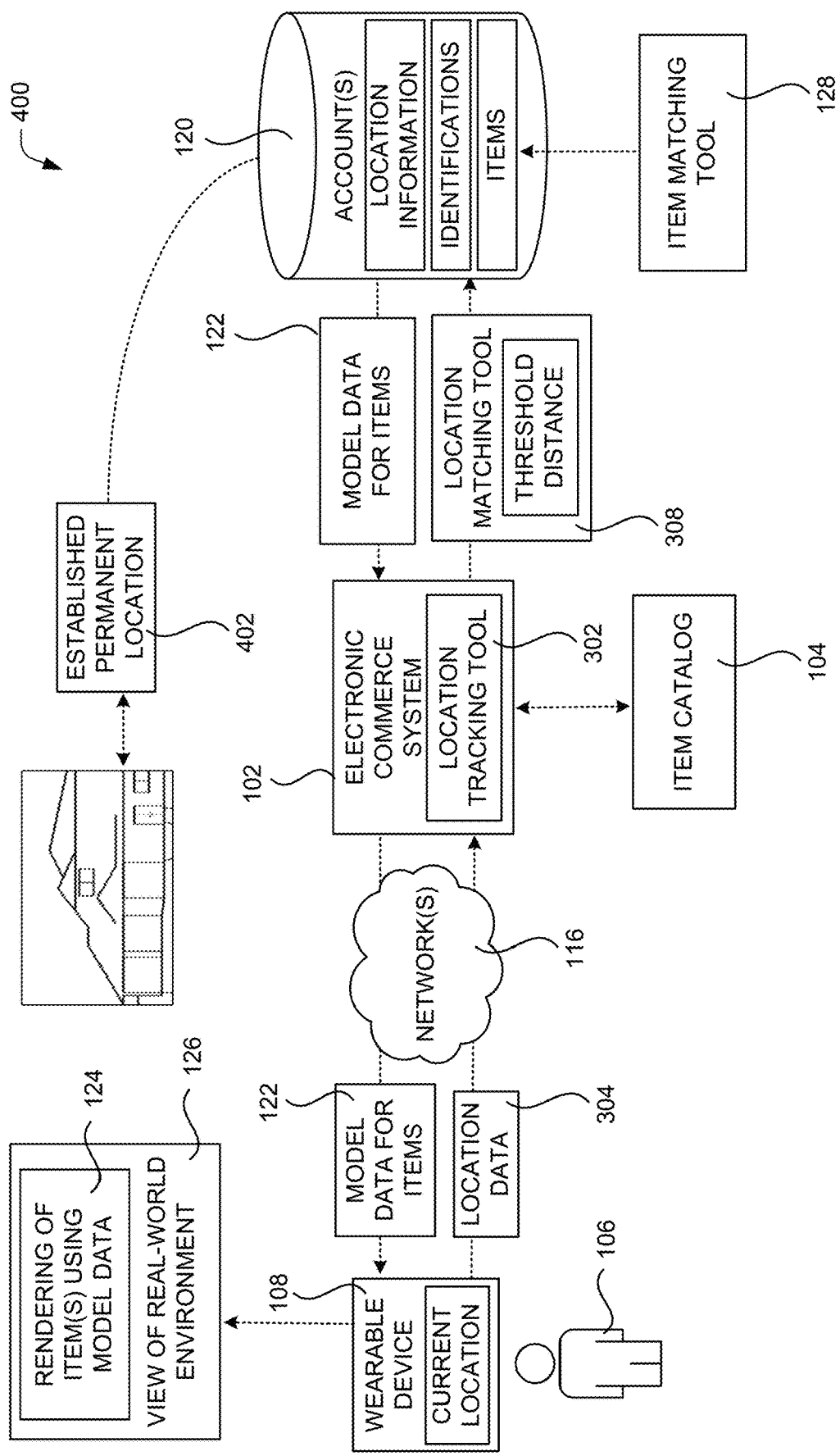
FIG. 4 illustrates aspects of another exemplary environment in which a system can render, for display, models of items using location data.

FIG. 4 illustrates aspects of another exemplary environment 400 in which a system can render, for display, models of items using location data. This example illustrates that an established permanent location 402 (e.g., a post mail address) associated with a physical structure, known to the e-commerce system 102, can be used by the location matching tool 308 to determine that a current location of the wearable device 108 is within a threshold distance of a source of an item (e.g., a house associated with a user account that has the item listed for sale, a brick-and-mortar retail store associated with a merchant account that has the item listed for sale, etc.). Consequently, items associated with an account 120 registered to the established permanent location 402 can be identified, and model data for the items 122 can be transmitted to the wearable device 108 so a rendering 124 of the items can be displayed to the user 106 in his or her view of the real-world environment 126.

FIG. 5 illustrates an example scenario in which a wearable device can display a rendering of an item in a user's view of a real-world environment based on facial recognition and/or location matching. For example, FIG. 5 shows an environment 500 where a first user 502 (e.g., first user 106 in FIGS. 1 and/or 3) is walking down a sidewalk of a street wearing a wearable device 504 (e.g., wearable device 108 in FIGS. 1 and/or 3). The wearable device 504 can capture image data of an environment that surrounds the first user 502 and transmit the image data to the e-commerce system 102. In this example, the image data includes facial data of a second user 506. In some implementations, the techniques described herein can be performed in an operation mode in which the wearable device 504 is configured to focus on obtaining facial data (e.g., scan for facial features while ignoring other image data in the user's surrounding environment).

The wearable device 504 and/or the e-commerce system 102 can use the image data and/or location information (e.g., location data being reported by user devices to the e-commerce system 102) to determine the first user 502 is within a threshold distance (e.g., five feet, ten feet, twenty feet, etc.) of the second user 506 (e.g., second user 114 in FIGS. 1 and/or 3), as referenced by 508. As shown, the first user 502 is about to walk by the second user 506 on a sidewalk. Moreover, the wearable device 504 and/or the e-commerce system 102 can apply facial recognition techniques to the image data to identify the second user 506.

Based on the determined identity of the second user and/or the determination that the two users are within a threshold distance of one another, the e-commerce system 102 can access an item associated with an account of the second user 506. Consequently, the e-commerce system 102 can cause the wearable device 504 to display a rendering of the item in a view of the real-world environment of the first user 502. The item can be an item the second user 506 is selling via an e-commerce site, an item the second user 506 is interested in purchasing, an item the second user 506 has recently purchased, an item the second user 506 has recently reviewed via an e-commerce site, etc.

In the example of FIG. 5, the second user 506 is selling a watch 510, and thus, the watch 510 and other item information (e.g., a price of the watch—$69) from an item listing in the item catalog 104 are displayed to the first user 502 via the wearable device 504. In some instances, an interest of the first user 502 in a same or similar watch may be a condition for displaying the watch 510 via the wearable device 504.

The wearable device 504 can display a rendering of the watch 510 at a location so that the first user 502 can deduce a graphical correspondence between the watch 510 and a particular user (e.g., the second user 506). This may be important given a scenario where there are multiple other users close to the first user 502 as the first user 502 walks down the sidewalk, and thus, the first user 502 would need to be informed of which user of the multiple other users is selling the watch 510.

In one example, a graphical correspondence can be realized by displaying the item on or close (e.g., within a predefined distance such as one feet, two feet, etc.) to the second user 506 so that the first user 502 knows the item is associated with the second user 506. In another example, a graphical correspondence can be realized by rendering a virtual connection (e.g., a line or an arrow) between the watch 510 and the second user 506 so that the first user 502 knows the item is associated with the second user 506.

FIG. 6 illustrates an example scenario in which a wearable device can display a rendering of an item in a user's view of a real-world environment based on structure recognition and/or location matching. Similar to FIG. 5, FIG. 6 shows an environment 600 where the first user 502 (of FIG. 5) is walking down a sidewalk of a street wearing a wearable device 504 that capture image data of an environment that surrounds the first user 502. In this example, the image data includes structure data of a physical structure 602. The wearable device 504 and/or the e-commerce system 102 can use the image data and/or location information (e.g., location data being reported by the wearable device 504 to the e-commerce system 102 and a known address of the physical structure 602) to determine the first user 502 is within a threshold distance (e.g., twenty thirty feet, ninety feet, three hundred feet, etc.) of the physical structure 602, as referenced by 604.

Based on the recognized physical structure and/or the determination that the first user 502 is within a threshold distance of the physical structure 602, the e-commerce system 102 can access an item associated with an account registered to the physical structure 602 (e.g., a post mail address). Consequently, the e-commerce system 102 can cause the wearable device 504 to display a rendering of the item in a view of the real-world environment of the first user 502.

In the example of FIG. 6, a user that lives at the house has a registered account that is selling a guitar 606 and an antique radio 608, and thus, the guitar 606 (e.g., price $299) and the antique radio 608 (e.g., price $199) are displayed to the first user 502 via the wearable device 504. Consequently, in some scenarios, the techniques described herein enable a user or a merchant to have a permanent and on-going "garage sale" for people that pass by.

The wearable device 504 can display a rendering of the guitar 606 and the antique radio 608 at a location so that the first user 502 can deduce a graphical correspondence between the items and the physical structure 602. In one example, a graphical correspondence can be realized by displaying the items on or close to the physical structure 602. In another example, a graphical correspondence can be realized by rendering a virtual connection (e.g., a line or an arrow) between the items and the physical structure 602.

In some cases, given a scenario where two users end up conversing about an item that the seller currently possesses, a user device can be used to authorize a transaction. For example, the second user 506 in FIG. 5 may be wearing the watch 510 currently listed for sale and the first user 502, after seeing the rendering of the watch 510, may stop the second user 506 and indicate an interest in purchasing the watch. In another example, the first user 502 in FIG. 6 may stop and knock on the door of the physical structure 602 to ask a question about the guitar 606, which may be located in the physical structure 602. Consequently, an item may be ready to be exchanged (e.g., sold, purchased, etc.).

In various examples, the wearable device 504 being worn by the user 502 can scan a code (e.g., a QR code) generated by an application on another user device (e.g., a smartphone of the buyer or the seller) to authorize a transaction. That is, to authorize a purchase initiated via the wearable device 504, the user 502 may be required to log-in, or to have recently logged-in (e.g., in the last hour, in the last ten minutes, etc.), to an e-commerce application (e.g., an AMAZON application, an EBAY application, etc.) installed on the other user device. By requiring the interaction between two user devices to authorize a transaction, an element of security is added and the possibility of fraud is reduced because a malicious user would need to control both user devices.

Figure 7:
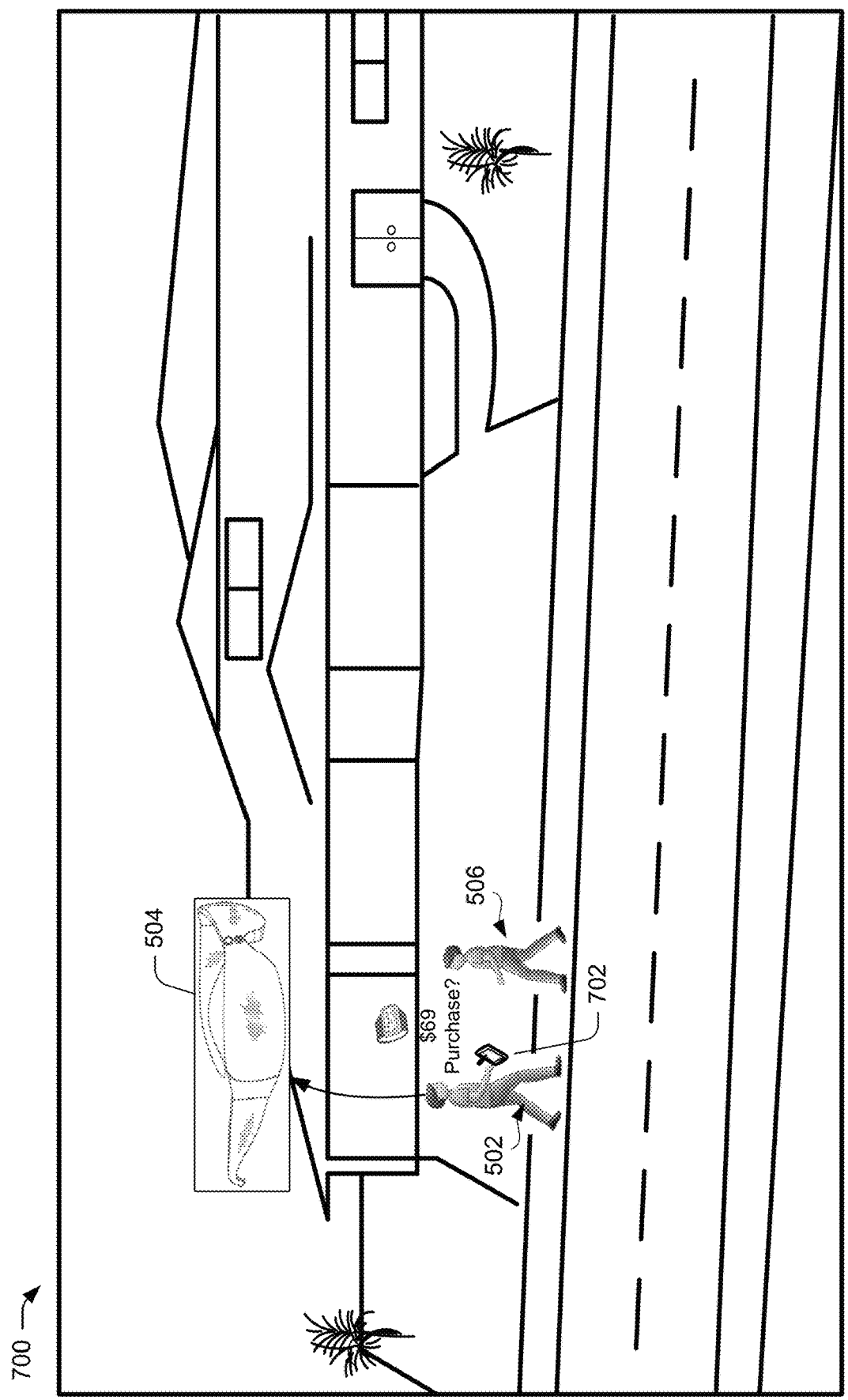
FIG. 7 illustrates an example scenario in which user devices can be used to authorize a transaction.

To further illustrate, FIG. 7 shows an example environment 700 where the first user 502 wearing the wearable device 504 wants to buy the item (e.g., the watch for $69) from the second user 506. Via the wearable device 504, the first user 502 may provide input indicating his or her interest in purchasing the watch and/or the first user 502 may ask the second user 506 to stop so the watch can be purchased.

To authorize the transaction, the wearable device 504 may need to interact with a second device 702 that belongs to the first user 502, or perhaps the second user 506. For example, the first user 502 may need to pull the second device 702 out of his or her pocket to scan a code (e.g., a QR code) generated based on the first user's 502 input to the wearable device 504 indicating his or her interest in purchasing the watch.

In another example, the wearable device 504 may communicate with the second device 702 to confirm that the first user 502 has successfully logged in to an application installed on the second device 702 (e.g., via credentials such as password and/or biometrics). Since the second user 506 is located right next to the first user 502, the second user can see that the transaction has been completed and can give the purchased item to the first user 502. In some cases, the second user may receive a notification indicating the transaction has been processed.

In alternative implementations, the second user 506 may be wearing a device (e.g., a wearable device) configured to scan credit card information on a credit card of the first user 502 and obtain facial recognition data of the first user 502 when processing a transaction. The device of the second user 506 can cross check the scanned credit card information with facial data of the first user 502 (e.g., stored in a user profile mapped to the credit card information) as another element of security against fraud.

FIGS. 8-11 are flow diagrams that each illustrate an example process describing aspects of the technologies presented herein with reference to FIGS. 1-7. A process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations.

The particular implementation of the technologies disclosed herein is a matter of choice dependent on the performance and other requirements of a computing device such as a wearable device. Accordingly, the logical operations described herein may be referred to variously as states, operations, structural devices, acts, or modules. These states, operations, structural devices, acts, and modules can be implemented in hardware, software (i.e. computer-executable instructions), firmware, in special-purpose digital logic, and any combination thereof. Generally, computer-executable instructions include routines, programs, objects, components, data structures, and the like that perform or implement particular functions. It should be appreciated that more or fewer operations can be performed than shown in the figures and described herein. These operations can also be performed in a different order than those described herein. Other processes described throughout this disclosure shall be interpreted accordingly.

Figure 8:
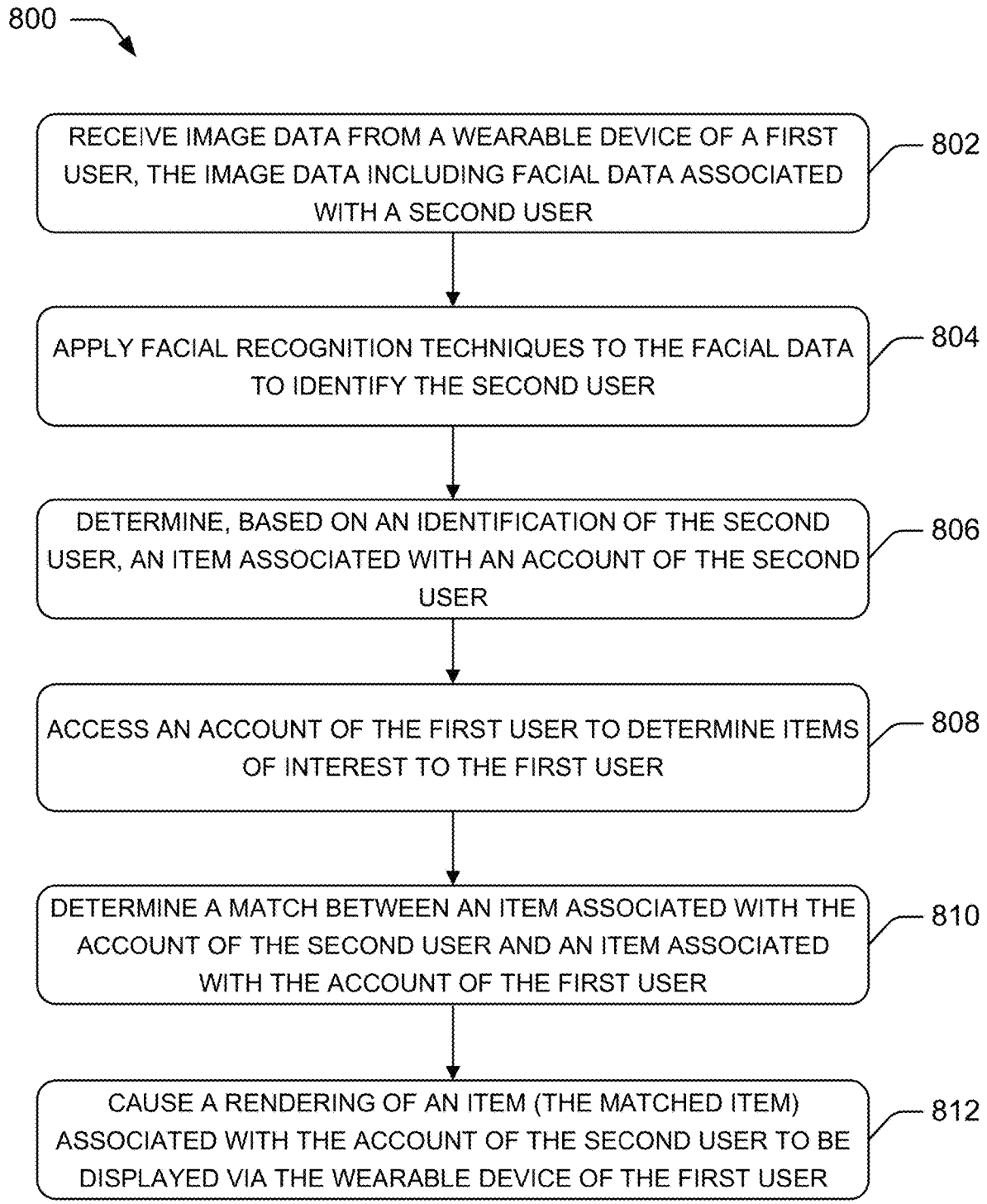
FIG. 8 is a flow diagram that illustrates an example process describing aspects of the technologies disclosed herein for causing models of an item to be rendered, for display, based on facial recognition.

FIG. 8 is a flow diagram that illustrates an example process 800 describing aspects of the technologies disclosed herein for causing a model of an item to be rendered, for display, based on facial recognition. The process 800 begins at block 802, where image data is received from a wearable device of a first user. As described above, the image data can capture physical objects included in real-world environment surrounding the first user. Moreover, the image data may include facial data associated with a second user that is physically located close to the first user. The process 800 then proceeds to block 804, where facial recognition techniques are applied to the facial data to identify the second user. For example, the facial data can be compared to facial characteristics in a series of user photos stored in various accounts associated with an e-commerce system. The e-commerce system can operate an e-commerce site where items can be listed for sale.

At block 806, an item associated with an account of the second user is determined based on the identification of the second user. The process 800 may then proceed to block 808 where an account associated with the first user is accessed to determine items that are of interest to the first user.

At block 810, a match between the item associated with the account of the second user and an item associated with the account of the first user is determined. In other words, the system identifies a common interest in an item. For example, the first user may be interested in purchasing an item that the second user currently has listed for sale. In another example, the first user may want to know more information about an item the second user recently purchased, an item the second user recently used, and/or an item for which the second user has provided a customer review. In even a further example, the second user may be interested in purchasing an item that the first user currently has listed for sale, or possesses and is willing to list for sale.

At block 812, a rendering of an item (e.g., the matched item) associated with the account of the second user is caused to be displayed on a display device of the wearable device of the first user. For instance, 3D model data of the item is transmitted from the e-commerce system 102 to the wearable device 108. In this way, the first user is made aware of the second user's familiarity, knowledge, and/or interest in the item, and the first user can decide whether or not to stop and talk to the second user about the item via a face-to-face interaction.

Figure 9:
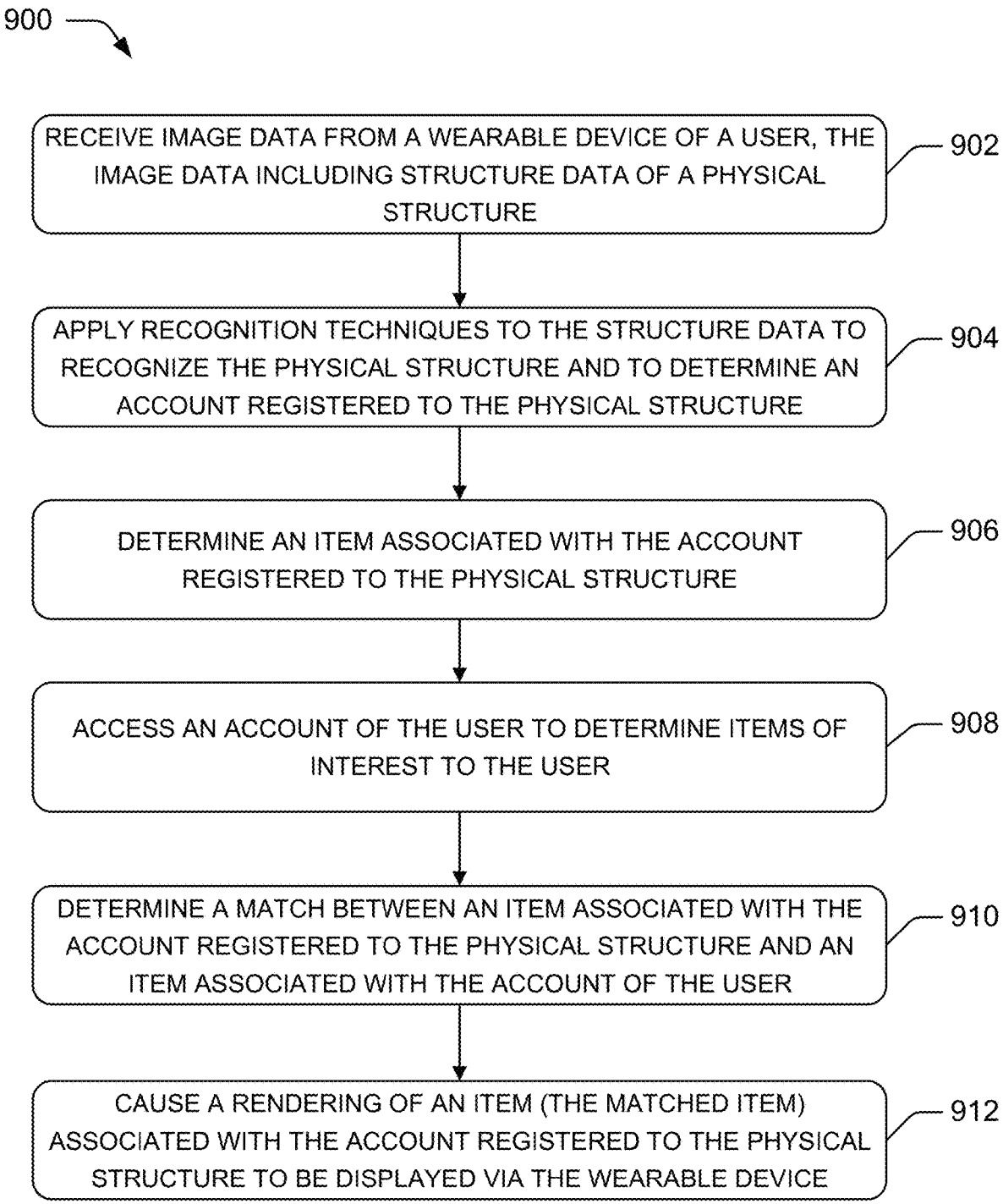
FIG. 9 is a flow diagram that illustrates an example process describing aspects of the technologies disclosed herein for causing models of an item to be rendered, for display, based on structure recognition.

FIG. 9 is a flow diagram that illustrates an example process 900 describing aspects of the technologies disclosed herein for causing a model of an item to be rendered, for display, based on structure recognition. The process 900 begins at block 902, where image data is received from a wearable device of a user. As described above, the image data may include structure data that outlines a geometry of a physical structure. The process 900 then proceeds to block 904, where recognition techniques are applied to the structure data to recognize the physical structure and determine an account that is registered to the physical structure (e.g., a user or merchant account associated with a post mail address).

At block 906, an item associated with the account is determined. The process 900 may then proceed to block 908 where an account associated with the user is accessed to determine items that are of interest to the user.

At block 910, a match between the item associated with the account registered to the physical structure and an item associated with the account of the user is determined.

At block 912, a rendering of an item (e.g., the matched item) associated with the account registered to the physical structure is caused to be displayed on a display device of the wearable device of the user. For instance, 3D model data of the item is transmitted from the e-commerce system 102 to the wearable device 108. In this way, the first user is made aware of an item for sale at the physical structure, for example, and the first user can decide whether or not to enter the physical structure (e.g., a brick-and-mortar retail store) or knock on a door of the physical structure (e.g., a private residence) to obtain more information about the item.

Figure 10:
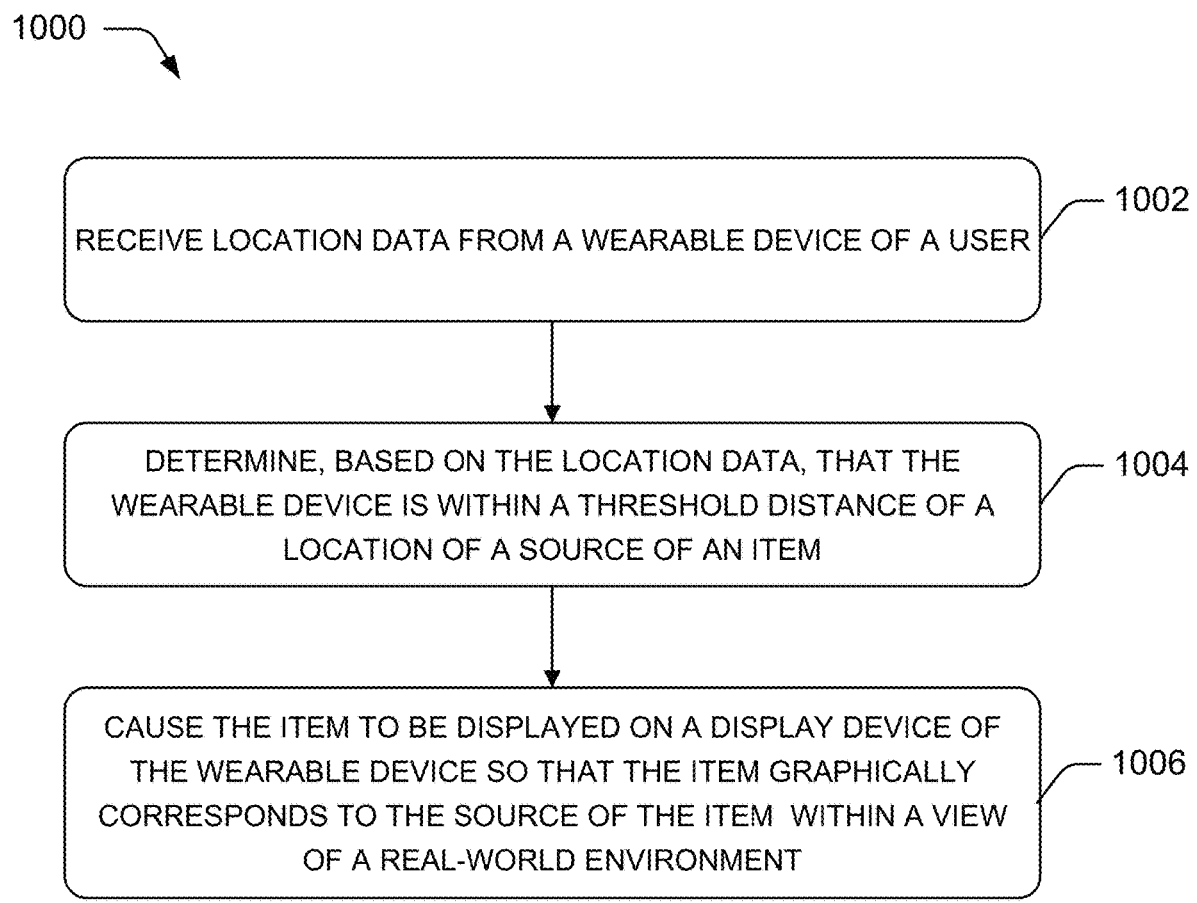
FIG. 10 is a flow diagram that illustrates an example process describing aspects of the technologies disclosed herein for causing models of an item to be rendered, for display, based on location information.

FIG. 10 is a flow diagram that illustrates an example process 1000 describing aspects of the technologies disclosed herein for causing a model of an item to be rendered, for display, based on location information. The process 1000 begins at block 1002, where location data is received from a wearable device of a user. The process 1000 proceeds to block 1004 where it is determined, based on the location data, that the wearable device is within a threshold distance of a location of a source of an item. As described above, the source of the item can be a user with an e-commerce account that lists the item for sale or the source of the item can be a physical structure to which an e-commerce account that lists the item for sale is registered. Moreover, the item can be an item in which the user is currently interested.

At block 1006, a rendering of the item is caused to be displayed on a display device of the wearable device of the user. The rendering of the item is caused to be displayed on the display device so that the rendering of the item graphically corresponds to the source of the item in a view of a real-world environment provided via the wearable device.

Figure 11:
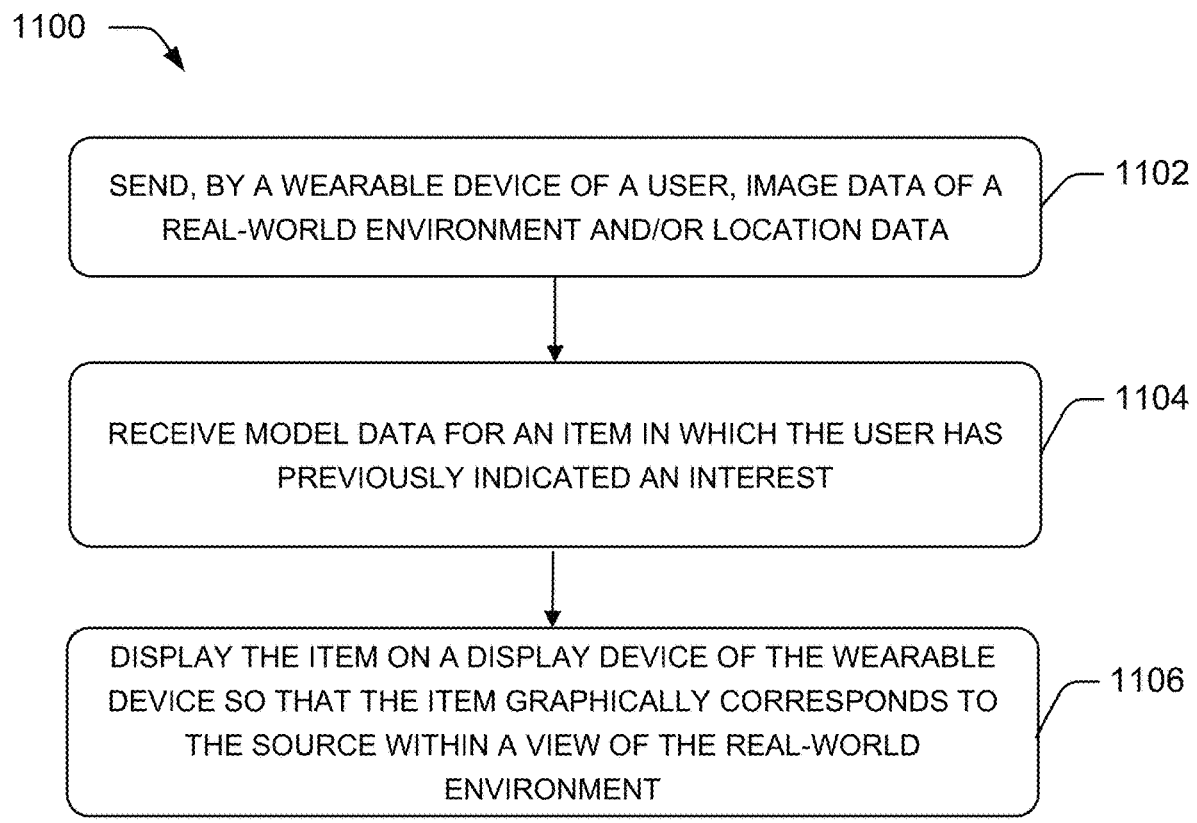
FIG. 11 is a flow diagram that illustrates an example process describing aspects of the technologies disclosed herein for transmitting data to an e-commerce system so that models of an item to be rendered, for display, via a wearable device.

FIG. 11 is a flow diagram that illustrates an example process 1100 describing aspects of the technologies disclosed herein for transmitting data to an e-commerce system so that a model of an item to be rendered, for display, via a wearable device. The process 1100 begins at block 1102, where image data of a real-world environment and/or location data are sent from a wearable device of a user to an e-commerce system. The process 1100 proceeds to block 1104 where model data for an item is received. In various examples, the item is an item for which the user has previously indicated an interest. Moreover, the item may be an item that a source (e.g., another user, a physical structure, etc.) within a threshold distance of the user currently has for sale.

At block 1106, a rendering of the item is displayed on a display device of the wearable device. The rendering of the item is displayed on the display device so that the rendering of the item graphically corresponds to the source of the item in a view of a real-world environment provided via the wearable device.

Figure 12:
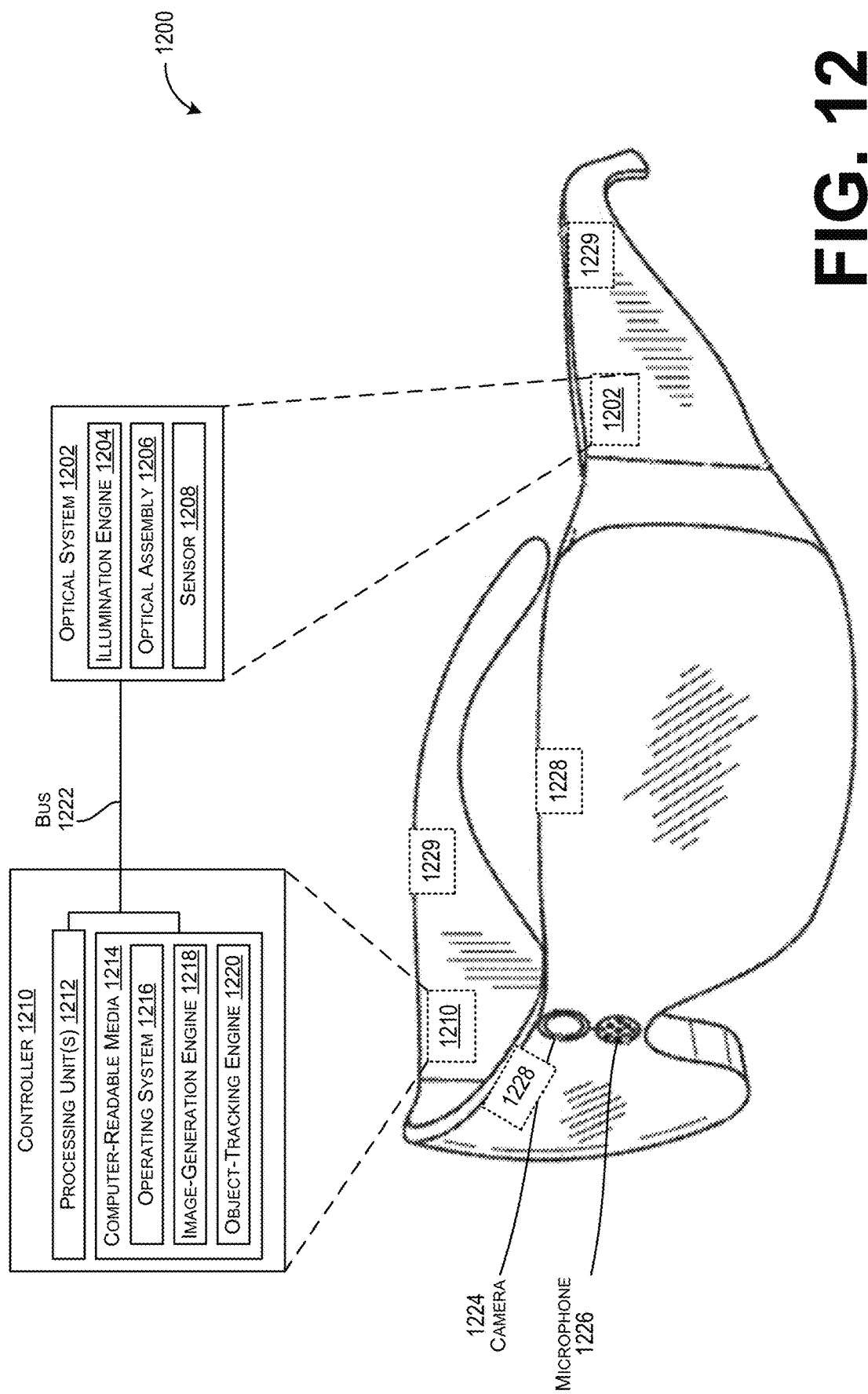
FIG. 12 shows an illustrative configuration of a wearable device capable of implementing aspects of the technologies disclosed herein.

FIG. 12 shows an illustrative configuration of a wearable device 1200 (e.g., a headset system, a head-mounted display, etc.) capable of implementing aspects of the technologies disclosed herein. The wearable device 1200 includes an optical system 1202 with an illumination engine 1204 to generate electro-magnetic ("EM") radiation that includes both a first bandwidth for generating computer-generated ("CG") images and a second bandwidth for tracking physical objects. The first bandwidth may include some or all of the visible-light portion of the EM spectrum whereas the second bandwidth may include any portion of the EM spectrum that is suitable to deploy a desired tracking protocol.

In the example configuration, the optical system 1202 further includes an optical assembly 1206 that is positioned to receive the EM radiation from the illumination engine 1204 and to direct the EM radiation (or individual bandwidths of thereof) along one or more predetermined optical paths. For example, the illumination engine 1204 may emit the EM radiation into the optical assembly 1206 along a common optical path that is shared by both the first bandwidth and the second bandwidth. The optical assembly 1206 may also include one or more optical components that are configured to separate the first bandwidth from the second bandwidth (e.g., by causing the first and second bandwidths to propagate along different image-generation and object-tracking optical paths, respectively).

The optical assembly 1206 includes components that are configured to direct the EM radiation with respect to one or more components of the optical assembly 1206 and, more specifically, to direct the first bandwidth for image-generation purposes and to direct the second bandwidth for object-tracking purposes. In this example, the optical system 1202 further includes a sensor 1208 to generate object data in response to a reflected-portion of the second bandwidth, i.e. a portion of the second bandwidth that is reflected off an object that exists within a real-world environment.

In various configurations, the wearable device 1200 may utilize the optical system 1202 to generate a composite view (e.g., from a perspective of a user 106 that is wearing the wearable device 1200) that includes both one or more CG images and a view of at least a portion of the real-world environment that includes the object. For example, the optical system 1202 may utilize various technologies such as, for example, AR technologies to generate composite views that include CG images superimposed over a real-world view. As such, the optical system 1202 may be configured to generate CG images via a display panel. The display panel can include separate right eye and left eye transparent display panels.

Alternatively, the display panel can include a single transparent display panel that is viewable with both eyes and/or a single transparent display panel that is viewable by a single eye only. Therefore, it can be appreciated that the technologies described herein may be deployed within a single-eye Near Eye Display ("NED") system (e.g., GOOGLE GLASS) and/or a dual-eye NED system (e.g., OCULUS RIFT). The wearable device 1200 is an example device that is used to provide context and illustrate various features and aspects of the user interface display technologies and systems disclosed herein. Other devices and systems may also use the interface display technologies and systems disclosed herein.

The display panel may be a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the wearable device 1200 may further include an additional see-through optical component.

In the illustrated example of FIG. 12, a controller 1210 is operatively coupled to each of the illumination engine 1204, the optical assembly 1206 (and/or scanning devices thereof,) and the sensor 1208. The controller 1210 includes one or more logic devices and one or more computer memory devices storing instructions executable by the logic device(s) to deploy functionalities described herein with relation to the optical system 1202. The controller 1210 can comprise one or more processing units 1212, one or more computer-readable media 1214 for storing an operating system 1216 and data such as, for example, image data that defines one or more CG images and/or tracking data that defines one or more object tracking protocols.

The computer-readable media 1214 may further include an image-generation engine 1218 that generates output signals to modulate generation of the first bandwidth of EM radiation by the illumination engine 1204 and also to control the scanner(s) to direct the first bandwidth within the optical assembly 1206. Ultimately, the scanner(s) direct the first bandwidth through a display panel to generate CG images that are perceptible to a user, such as a user interface.

The computer-readable media 1214 may further include an object-tracking engine 1220 that generates output signals to modulate generation of the second bandwidth of EM radiation by the illumination engine 1204 and also the scanner(s) to direct the second bandwidth along an object-tracking optical path to irradiate an object. The object tracking engine 1220 communicates with the sensor 1208 to receive the object data that is generated based on the reflected-portion of the second bandwidth.

The object tracking engine 1220 then analyzes the object data to determine one or more characteristics of the object such as, for example, a depth of the object with respect to the optical system 1202, an orientation of the object with respect to the optical system 1202, a velocity and/or acceleration of the object with respect to the optical system 1202, or any other desired characteristic of the object. The components of the wearable device 1200 are operatively connected, for example, via a bus 1222, which can include one or more of a system bus, a data bus, an address bus, a PCI bus, a Mini-PCI bus, and any variety of local, peripheral, and/or independent buses.

The wearable device 1200 may further include various other components, for example cameras (e.g., camera 1224), microphones (e.g., microphone 1226), accelerometers, gyroscopes, magnetometers, temperature sensors, touch sensors, biometric sensors, other image sensors, energy-storage components (e.g. battery), a communication facility, a GPS receiver, etc. Furthermore, the wearable device 1200 can include one or more eye gaze sensors 1228. In at least one example, an eye gaze sensor 1228 is user facing and is configured to track the position of at least one eye of a user. Accordingly, eye position data (e.g., determined via use of eye gaze sensor 1228), image data (e.g., determined via use of the camera 1224), and other data can be processed to identify a gaze path of the user. That is, it can be determined that the user is looking at a particular section of a hardware display surface, a particular real-world object or part of a real-world object in the view of the user, and/or a rendered object or part of a rendered object displayed on a hardware display surface.

In some configurations, the wearable device 1200 can include an actuator 1229. The processing units 1212 can cause the generation of a haptic signal associated with a generated haptic effect to actuator 1229, which in turn outputs haptic effects such as vibrotactile haptic effects, electrostatic friction haptic effects, or deformation haptic effects. Actuator 1229 includes an actuator drive circuit. The actuator 1229 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator.

In alternate configurations, wearable device 1200 can include one or more additional actuators 1229. The actuator 1229 is an example of a haptic output device, where a haptic output device is a device configured to output haptic effects, such as vibrotactile haptic effects, electrostatic friction haptic effects, or deformation haptic effects, in response to a drive signal. In alternate configurations, the actuator 1229 can be replaced by some other type of haptic output device. Further, in other alternate configurations, wearable device 1200 may not include actuator 1229, and a separate device from wearable device 1200 includes an actuator, or other haptic output device, that generates the haptic effects, and wearable device 1200 sends generated haptic signals to that device through a communication device.

The processing unit(s) 1212, can represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As used herein, computer-readable media, such as computer-readable media 1214, can store instructions executable by the processing unit(s) 1222. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

In various examples, the wearable device 1200 is configured to interact, via network communications, with a network device (e.g., a network server or a cloud server) to implement the configurations described herein. For instance, the wearable device 1200 may collect data and send the data over network(s) to the network device. The network device may then implement some of the functionality described herein. Subsequently, the network device can cause the wearable device 1200 to display an item and/or instruct the wearable device 1200 to perform a task.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

In accordance with examples described herein, the wearable device 108 can also be configured to use network communications to interact with an e-commerce provider of an electronic marketplace. To implement the electronic marketplace, the e-commerce provider creates and maintains catalog(s) of items. The items can be bought and/or sold by registered users and/or merchants. Accordingly, the e-commerce provider can comprise resources to collect and store information related to an item, to display the information related to the item to a potential buyer, to conduct online auctions of an item, to match a buyer of an item with a seller of the item, to process a transaction, etc.

Figure 13:
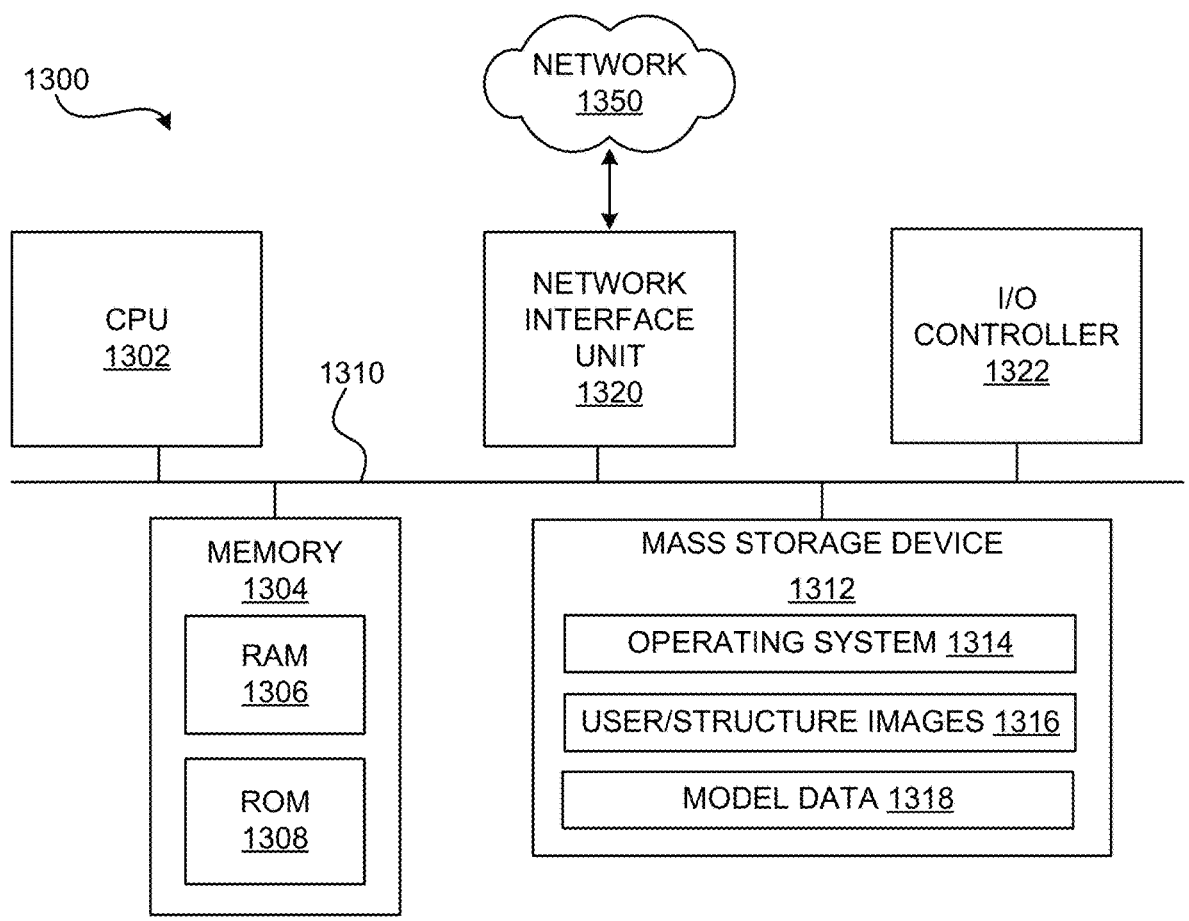
FIG. 13 illustrates additional details of an example computer architecture for a computer capable of implementing aspects of the technologies described herein.

FIG. 13 shows additional details of an example computer architecture for a computer capable of executing the functionalities described herein such as, for example, those described with reference to FIGS. 1-11, or any program components thereof as described herein. Thus, the computer architecture 1300 illustrated in FIG. 13 illustrates an architecture for a server computer, or network of server computers, or any other type of computing device suitable for implementing the functionality described herein. The computer architecture 1300 may be utilized to execute any aspects of the software components presented herein, such as software components for implementing the e-commerce system 102, including the facial recognition tool 118, the item matching tool 128, the structure recognition tool 204, the location tracking tool 302, and/or the location matching tool 308.

The computer architecture 1300 illustrated in FIG. 13 includes a central processing unit 1302 ("CPU"), a system memory 1304, including a random-access memory 1306 ("RAM") and a read-only memory ("ROM") 1308, and a system bus 1310 that couples the memory 1304 to the CPU 1302. A basic input/output system containing the basic routines that help to transfer information between elements within the computer architecture 1300, such as during startup, is stored in the ROM 1308. The computer architecture 1300 further includes a mass storage device 1312 for storing an operating system 1314, other data, and one or more application programs. For example, the mass storage device 1312 may store images 1316 (e.g., photos) of users and/or physical structures, as well as 3D model data 1318 for items.

The mass storage device 1312 is connected to the CPU 1302 through a mass storage controller (not shown) connected to the bus 1310. The mass storage device 1312 and its associated computer-readable media provide non-volatile storage for the computer architecture 1300. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 1300.

According to various implementations, the computer architecture 1300 may operate in a networked environment using logical connections to remote computers through a network 1350. The computer architecture 1300 may connect to the network 1350 through a network interface unit 1320 connected to the bus 1310. It should be appreciated that the network interface unit 1320 also may be utilized to connect to other types of networks and remote computer systems. The computer architecture 1300 also may include an input/output controller 1322 for receiving and processing input from a number of other devices, including a keyboard, mouse, or electronic stylus. Similarly, the input/output controller 1322 may provide output to a display screen, a printer, or other type of output device. It should also be appreciated that a computing system can be implemented using the disclosed computer architecture 1300 to communicate with other computing systems.

It should be appreciated that the software components described herein may, when loaded into the CPU 1302 and executed, transform the CPU 1302 and the overall computer architecture 1300 from a general-purpose computing system into a special-purpose computing system customized to facilitate the functionality presented herein. The CPU 1302 may be constructed from any number of transistors or other discrete circuit elements, which may individually or collectively assume any number of states. More specifically, the CPU 1302 may operate as a finite-state machine, in response to executable instructions contained within the software modules disclosed herein. These computer-executable instructions may transform the CPU 1302 by specifying how the CPU 1302 transitions between states, thereby transforming the transistors or other discrete hardware elements constituting the CPU 1302.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1300 in order to store and execute the software components presented herein. It also should be appreciated that the computer architecture 1300 may include other types of computing devices, including smartphones, embedded computer systems, tablet computers, other types of wearable computing devices, and other types of computing devices known to those skilled in the art. It is also contemplated that the computer architecture 1300 may not include all of the components shown in FIG. 13, may include other components that are not explicitly shown in FIG. 13, or may utilize an architecture completely different than that shown in FIG. 13.

Illustrative Configurations

The following clauses described multiple possible configurations for implementing the features described in this disclosure. The various configurations described herein are not limiting nor is every feature from any given configuration required to be present in another configuration. Any two or more of the configurations may be combined together unless the context clearly indicates otherwise. As used herein in this document "or" means and/or. For example, "A or B" means A without B, B without A, or A and B. As used herein, "comprising" means including listed all features and potentially including addition of other features that are not listed. "Consisting essentially of" means including the listed features and those additional features that do not materially affect the basic and novel characteristics of the listed features. "Consisting of" means only the listed features to the exclusion of any feature not listed.

The disclosure presented herein also encompasses the subject matter set forth in the following clauses.

Example Clause A, a computer-implemented method comprising: recognizing, based on image data of an environment of a first user wearing a wearable device, facial characteristics of a second user that is located within a threshold distance of the first user, the facial characteristics identifying the second user; using an identification of the second user to determine an item associated with an account of the second user, the item including at least one of: an item the second user currently has listed for sale via an electronic commerce site, an item the second user has purchased via the electronic commerce site, an item the second user is currently interested in, or an item for which the second user has provided a review via the electronic commerce site; accessing, by one or more processors, information associated with the first user, wherein the information comprises at least one of a browsing history or a list of items the first user is interested in; determining a match between the item associated with the account of the second user and an item associated with the browsing history or the list of items the first user is interested in; and causing a rendering of the matched item to be displayed on a display device of the wearable device of the first user, the rendering of the matched item caused to be displayed at a location that is proximal to the second user.

Example Clause B, the computer-implemented method of Example Clause A, wherein the second user is determined to be within the threshold distance of the first user based on location data received from the wearable device and from another device of the second user indicating that the second user is within the threshold distance of the first user.

Example Clause C, a system comprising: one or more processors; and a memory in communication with the one or more processors, the memory having computer-readable instructions stored thereupon which, when executed by the one or more processors, cause the one or more processors to: receive image data from a wearable device of a first user, the image data including facial data associated with a second user; apply facial recognition techniques to the facial data to identify the second user; determine, based on an identification of the second user, an item associated with an account of the second user, the item including at least one of: an item the second user currently has for sale via an electronic commerce site, an item the second user has purchased via the electronic commerce site, or an item for which the second user has provided a customer review via the electronic commerce site; and cause a rendering of the item associated with the account of the second user to be displayed on a display device of the wearable device of the first user.

Example Clause D, the system of Example Clause C, wherein the rendering of the item associated with the account of the second user is caused to be displayed on the display device so that the rendering of the item graphically corresponds to the second user.

Example Clause E, the system of Example Clause D, wherein a graphical correspondence comprises at least one of: a display device location that is within a threshold distance of the second user; or a graphical connector between the rendering of the item and the second user.

Example Clause F, the system of any one of Example Clauses C through E, wherein the computer-readable instructions further cause the one or more processors to: determine an item associated with an account of the first user, the item being an item of interest to the first user; and determine, as a condition for display of the rendering of the item, that the item associated with the account of the second user matches the item associated with the account of the first user.

Example Clause G, the system of Example Clause F, wherein the item of interest to the first user is determined based on the electronic commerce site browsing history or an item interest list associated with the electronic commerce site.

Example Clause H, the system of any one of Example Clauses C through G, wherein the computer-readable instructions further cause the one or more processors to determine a distance between the first user and the second user, wherein the distance between the first user and the second user is within a threshold distance.

Example Clause I, the system of Example Clause H, wherein the distance is determined based on location information received from the wearable device and another device of the second user.

Example Clause J, the system of any one of Example Clauses C through G, wherein the second user is identified based on a match between the facial data and facial characteristics in a photo of the second user stored in association with the account of the second user.

Example Clause K, a system comprising: one or more processors; and a memory in communication with the one or more processors, the memory having computer-readable instructions stored thereupon which, when executed by the one or more processors, cause the one or more processors to: receive location data from a wearable device of a user; determine, based on the location data, that the wearable device is within a threshold distance of a location of a source of an item, the item matching an item in which the user is currently interested; and cause a rendering of the item to be displayed on a display device of the wearable device of the user, wherein the rendering of the item is caused to be displayed on the display device so that the rendering of the item graphically corresponds to the source of the item in a view of a real-world environment provided via the wearable device.

Example Clause L, the system of Example Clause K, wherein the source of the item comprises a physical structure where the item can be purchased.

Example Clause M, the system of Example Clause K or Example Clause L, wherein a graphical correspondence comprises at least one of: a display device location that is within a threshold distance of the source of the item; or a graphical connector between the rendering of the item and the source of the item.

Example Clause N, system of any one of Example Clauses K through M, wherein the item in which the user is currently interested is determined based on an electronic commerce site browsing history or an item interest list associated with the electronic commerce site.

Example Clause O, the system of Example Clause K, wherein the source of the item comprises another user and the item comprises an item the other user is selling via an electronic commerce site.

Example Clause P, the system of Example Clause K, wherein the source of the item comprises another user and the item comprises an item the other user has recently purchased via an electronic commerce site.

Example Clause Q, the system of Example Clause K, wherein the source of the item comprises another user and the item comprises an item for which the other user has provided a customer review.

Example Clause R, the system of Example Clause K, wherein the location of the source of the item comprises a post mail address.

Example Clause S, the system of Example Clause K, wherein the source of the item comprises another user and the location of the other user is determined based on additional location data received from a device of the other user.

Example Clause T, the system of any one of Example Clauses K through S, wherein the computer-readable instructions further cause the one or more processors to cause information about the item to be displayed in association with the rendering of the item, the information comprising a price at which the item is listed for sale.

Conclusion

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary and/or Detailed Description may be used to distinguish between two different instances of the same element (e.g., two different users, two different accounts, two different items, etc.).

Certain configurations are described herein, including the best mode known to the inventors for carrying out the invention. Of course, variations on these described configurations will become apparent to those of ordinary skill in the art upon reading the foregoing description. Skilled artisans will know how to employ such variations as appropriate, and the configurations disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

What is claimed is:

1. A method comprising:
    scanning, by an optical device of a wearable device, a real-world environment and obtaining image data from the scanning for displaying augmented reality of the real-world environment, the augmented reality displayed via a display device of the wearable device, the wearable device worn by a first user;
    identifying, by processing the image data, a second user that is within the real-world environment and that is located in proximity to the first user based on a threshold distance;
    determining an item associated with an account of the second user based on the identifying;
    determining signals for items of interest for the first user;
    determining a match between the item associated with the account of the second user and the signals for the items of interest for the first user;
    receiving authorization to display the item, the authorization to display the item received from the second user and for displaying the item to the first user, and the authorization to display the item being based on the proximity of the second user to the first user; and
    responsive to receiving the authorization to display the item, causing a rendering of a 2D or 3D model of the item to be displayed in the augmented reality on the display device, the rendering of the 2D or 3D model of the item displayed at a location in the augmented reality that is proximal to the second user as displayed in the augmented reality.

2. The method of claim 1, wherein the second user is determined to be in the proximity of the first user based on location data received from the wearable device and from another device of the second user indicating that the second user is within the threshold distance of the first user.

3. The method of claim 2, wherein the wearable device includes a GPS receiver.

4. The method of claim 1, wherein the rendering of the 2D or 3D model of the item is further displayed at the location that is proximal to the second user with a graphical connector connecting the rendering of the 2D or 3D model to the second user as displayed within the augmented reality.

5. The method of claim 1, wherein the display device comprises a hardware display surface.

6. The method of claim 1, further comprising determining a time at which to display the item to the first user.

7. The method of claim 1, wherein obtaining the image data includes obtaining facial data of people that are within the threshold distance to the first user.

8. The method of claim 1, further comprising:
    based on identifying the proximity of second user to the first user, signaling the second user to provide the authorization to display the item to the first user; and
    receiving the authorization to display the item from the second user in response to the signaling.

9. A system comprising:
- an optical device to scan a real-world environment and obtain image data from the scan for displaying augmented reality of the real-world environment;
- a display device to display the augmented reality of the real-world environment, the optical device and the display device coupled to a wearable device worn by a first user;
- one or more processors; and
- a memory in communication with the one or more processors, the memory having computer-readable instructions stored thereupon which, when executed by the one or more processors, cause the one or more processors to:
  - process the image data to identify a second user that is within the real-world environment, the second user located in proximity to the first user based on a threshold distance;
  - determine an item associated with an account of the second user based on identification of the second user;
  - determine signals for items of interest for the first user including the item associated with the account of the second user;
  - receive authorization to display the item, the authorization to display the item received from the second user and for displaying the item to the first user, and the authorization to display the item being based on the proximity of the second user to the first user; and
  - responsive to receiving the authorization to display the item, cause a rendering of a 2D or 3D model of the item to be displayed in the augmented reality via the display device.

10. The system of claim 9, wherein the rendering of the 2D or 3D model of the item is caused to be displayed on the display device so that the rendering of the 2D or 3D model of the item graphically corresponds to the second user as displayed in the augmented reality.

11. The system of claim 10, wherein a graphical correspondence comprises at least one of:
- a display device location that is within a threshold distance of the second user in the augmented reality; or
- a graphical connector displayed in the augmented reality between the rendering of the 2D or 3D model of the item and the second user.

12. The system of claim 9, wherein the computer-readable instructions further cause the one or more processors to:
- determine at least one item associated with an account of the first user based on analysis of a browsing history of the first user and social media activity of the first user; and
- determine, as a condition for display of the rendering of the 2D or 3D model of the item, that the item matches the at least one item associated with the account of the first user.

13. The system of claim 12, wherein the analysis indicates that the item is of interest to the first user based on the browsing history indicating the first user browses an electronic commerce site or has created an item interest list associated with the electronic commerce site.

14. The system of claim 9, wherein the proximity is determined based on location information received from the wearable device and another device of the second user.

15. The system of claim 9, wherein the second user is identified based on a match between facial characteristics of the second user in the image data and in a photo of the second user stored in association with the account of the second user.

16. The system of claim 9, further comprising a gaze tracking sensor to track a gaze of the first user in connection with the rendering of the 2D or 3D model of the item.

17. The system of claim 9, wherein the computer-readable instructions further cause the one or more processors to obtain facial data of people that are within the threshold distance to the first user, the facial data of the people obtained from the image data.

18. Computer-readable storage media having instructions stored thereupon that are executable by one or more processors to perform operations comprising:
- scanning, by an optical device of a wearable device, a real-world environment and obtaining image data from the scanning for displaying augmented reality of the real-world environment, the augmented reality displayed via a display device of the wearable device, the wearable device worn by a first user;
- identifying, by processing the image data, a second user that is within the real-world environment and that is located in proximity to the first user based on a threshold distance;
- determining an item associated with an account of the second user based on the identifying;
- determining signals for items of interest for the first user;
- determining a match between the item associated with the account of the second user and the signals for the items of interest for the first user;
- receiving authorization to display the item, the authorization to display the item received from the second user and for displaying the item to the first user, and the authorization to display the item being based on the proximity of the second user to the first user; and
- responsive to receiving the authorization to display the item, causing a rendering of a 2D or 3D model of the item to be displayed in the augmented reality on the display device, the rendering of the 2D or 3D model of the item displayed at a location in the augmented reality that is proximal to the second user as displayed in the augmented reality.

19. The computer-readable storage media of claim 18, wherein the second user is identified by processing the image data using one or more facial recognition techniques and recognizing facial characteristics of the second user.

20. The computer-readable storage media of claim 18, wherein the rendering of the 2D or 3D model of the item is further displayed at the location that is proximal to the second user with a graphical connector connecting the rendering of the 2D or 3D model to the second user as displayed within the augmented reality.

* * * * *